US012549904B2

(12) United States Patent
Li et al.

(10) Patent No.: US 12,549,904 B2
(45) Date of Patent: Feb. 10, 2026

(54) KERNEL OF SPEAKER MODULE, SPEAKER MODULE, AND EARPHONE

(71) Applicant: Beijing Honor Device Co., Ltd., Beijing (CN)

(72) Inventors: Yunhai Li, Beijing (CN); Jianfei Chu, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 170 days.

(21) Appl. No.: 18/688,891

(22) PCT Filed: Aug. 24, 2022

(86) PCT No.: PCT/CN2022/114488
§ 371 (c)(1),
(2) Date: Mar. 4, 2024

(87) PCT Pub. No.: WO2023/030127
PCT Pub. Date: Mar. 9, 2023

(65) Prior Publication Data

US 2024/0284111 A1 Aug. 22, 2024

(30) Foreign Application Priority Data

Sep. 6, 2021 (CN) ......................... 202111038813.6

(51) Int. Cl.
*H04R 1/00* (2006.01)
*H04R 1/24* (2006.01)
(Continued)

(52) U.S. Cl.
CPC ............... *H04R 9/025* (2013.01); *H04R 1/24* (2013.01); *H04R 7/18* (2013.01); *H04R 9/045* (2013.01);
(Continued)

(58) Field of Classification Search
CPC . H04R 9/025; H04R 1/24; H04R 7/18; H04R 9/045; H04R 9/047; H04R 9/06; H04R 1/10
(Continued)

(56) References Cited

U.S. PATENT DOCUMENTS 9,894,442 B2 2/2018 Salvatti
10,459,019 B2 10/2019 Wu et al.
(Continued)

FOREIGN PATENT DOCUMENTS

CN 201682610 U 12/2010
CN 107113506 A 8/2017
(Continued)

*Primary Examiner* — William J Deane, Jr.
(74) *Attorney, Agent, or Firm* — WOMBLE BOND DICKINSON (US) LLP

(57) ABSTRACT

A kernel of a speaker module, a speaker module, and an earphone are provided and related to the field of electronic product technologies. The kernel includes a first diaphragm assembly, a first voice coil, a magnetic circuit system, a second diaphragm assembly, and a second voice coil. The magnetic circuit system includes a first magnetic portion, a second magnetic portion, and a third magnetic portion. The first magnetic portion surrounds a periphery of the second magnetic portion. The first voice coil cooperates with the first magnetic portion and the second magnetic portion to drive the first diaphragm assembly to vibrate. The second voice coil is fastened to the second diaphragm assembly, and the second diaphragm and the first diaphragm assembly are arranged on the magnetic circuit system. The second voice coil cooperates with the second magnetic portion to drive the second diaphragm assembly to vibrate.

20 Claims, 16 Drawing Sheets

(51) Int. Cl.

| | |
|---|---|
| ***H04R 7/18*** | (2006.01) |
| ***H04R 9/02*** | (2006.01) |
| ***H04R 9/04*** | (2006.01) |
| ***H04R 9/06*** | (2006.01) |
| *H04R 1/10* | (2006.01) |

(52) U.S. Cl.
CPC ............... *H04R 9/047* (2013.01); *H04R 9/06* (2013.01); *H04R 1/10* (2013.01)

(58) Field of Classification Search
USPC ..................................................... 381/412, 17
See application file for complete search history.

(56) References Cited

U.S. PATENT DOCUMENTS

| | | | | |
|---|---|---|---|---|
| 2015/0023506 | A1* | 1/2015 | Jansson | H04R 3/12 381/17 |
| 2016/0277842 | A1* | 9/2016 | Daley | H04R 9/06 |
| 2021/0289280 | A1 | 9/2021 | Ko et al. | |
| 2024/0365069 | A1* | 10/2024 | Zhu | H04R 9/045 |
| 2025/0020946 | A1* | 1/2025 | Guo | G10K 11/178 |

FOREIGN PATENT DOCUMENTS

| | | | |
|---|---|---|---|
| CN | 206640782 | U | 11/2017 |
| CN | 109587605 | A | 4/2019 |
| CN | 111988711 | A | 11/2020 |
| CN | 212344023 | U | 1/2021 |
| CN | 212727403 | U | 3/2021 |
| JP | 2007221417 | A | 8/2007 |
| KR | 102292933 | B1 | 8/2021 |

* cited by examiner

D-D

E-E

KERNEL OF SPEAKER MODULE, SPEAKER MODULE, AND EARPHONE

CROSS-REFERENCE TO RELATED APPLICATIONS

This application is a national stage of International Application No. PCT/CN2022/114488, filed on Aug. 24, 2022, which claims priority to Chinese Patent Application No. 202111038813.6, filed on Sep. 6, 2021. The disclosures of both of the aforementioned applications are hereby incorporated by reference in their entireties.

TECHNICAL FIELD

This application relates to the field of electronic product technologies, and in particular, to a kernel of a speaker module, a speaker module, and an earphone.

BACKGROUND

In a related art, a speaker module in an earphone usually adopts a moving coil vibration system, which is cheap and technically mature, and has good performance. However, a vibration mass of the moving coil vibration system is large and transient characteristics are not good, and mass distribution, membrane compliance, and asymmetric distribution of an electromagnetic driving force produce different degrees of wag vibration and split vibration of different frequencies, resulting in serious peaks and valleys in a high-frequency response, which causes low expansion of high frequency low, and affects sound quality of the earphone.

SUMMARY

This application provides a kernel of a speaker module, a speaker module, and an earphone, which have good performance in sound ranges at different frequencies, good sound quality, and a small size.

To achieve the foregoing objective, the following technical solutions are used in embodiments of this application:

According to a first aspect, this application provides a kernel of a speaker module, and the kernel includes a first diaphragm assembly, a first voice coil, and a magnetic circuit system. The first voice coil is fastened to the first diaphragm assembly. The magnetic circuit system includes a first magnetic portion and a second magnetic portion, the first magnetic portion surrounds a periphery of the second magnetic portion, the first magnetic portion is spaced apart from the second magnetic portion, and the first voice coil cooperates with the first magnetic portion and the second magnetic portion to drive the first diaphragm assembly to vibrate. An inner side of the second magnetic portion includes an accommodating space, the magnetic circuit system further includes a third magnetic portion, and the third magnetic portion is arranged in the accommodating space, and is spaced apart from the second magnetic portion. The kernel further includes a second diaphragm assembly and a second voice coil. The second diaphragm and the first diaphragm assembly are respectively arranged on two opposite sides of the magnetic circuit system. The second voice coil is a planar voice coil, the second voice coil is fastened to the second diaphragm assembly, and the second voice coil cooperates with the second magnetic portion and the third magnetic portion to drive the second diaphragm assembly to vibrate.

In the kernel of the speaker module provided in this application, the accommodating space is formed on the inner side of the second magnetic portion, and the third magnetic portion is arranged in the accommodating space, so that the second magnetic portion can respectively cooperate with the first magnetic portion and the third magnetic portion, to form a first magnetic loop and a second magnetic loop that are spaced apart in a radial direction of the kernel. In this way, the first diaphragm assembly and the second diaphragm assembly may be simultaneously driven to vibrate by the magnetic circuit system without increasing a thickness of the magnetic circuit system. In addition, the second voice coil is set to the planar voice coil, so that a thickness of the kernel can be further reduced, and sound quality of the kernel in a high frequency band can also be improved, thereby reducing a sense of division of a timbre of the kernel and improving sound quality of the earphone. In this way, the thickness of the kernel in this application may be increased by only 0.2 mm to 1 mm (for example, 0.2 mm, 0.3 mm, 0.5 mm, 0.8 mm, 0.9 mm, or 1 mm) compared with a thickness of a kernel with a single diaphragm assembly, and both thinness and audio performance of the kernel can be taken into account.

In a possible design manner of the first aspect, a first magnetic gap is defined between the first magnetic portion and the second magnetic portion, and at least a part of the first voice coil extends into the first magnetic gap. Based on this, the first voice coil and the first diaphragm assembly may form at least a part of a moving coil vibration system. The moving coil vibration system is cheap and technically mature, and has good performance.

In a possible design manner of the first aspect, an effective area of the second diaphragm assembly is less than an effective area of the first diaphragm assembly. Because the effective area of the first diaphragm assembly and the effective area of the second diaphragm assembly are different, the first diaphragm assembly and the second diaphragm assembly may generate different vibration frequencies, so that the kernel has good performance in sound ranges at different frequencies, and the sound quality of the kernel is improved.

In a possible design manner of the first aspect, the first diaphragm assembly is a low-frequency diaphragm assembly, and the second diaphragm assembly is a high-frequency diaphragm assembly. In this way, the kernel has good performance in both a low-frequency sound range and a high-frequency sound range, and it is conducive to improving the sound quality of the kernel.

In a possible design manner of the first aspect, the first magnetic portion is a first magnet, the second magnetic portion is a second magnet, the third magnetic portion is a third magnet, a magnetization direction of the first magnet is opposite to a magnetization direction of the second magnet, and a magnetization direction of the third magnet is opposite to the magnetization direction of the second magnet. Therefore, the first magnetic portion and the second magnetic portion may form a first magnetic loop configured to drive the first voice coil to vibrate, which has a simple structure, and is easy to assemble.

In a possible design manner of the first aspect, the first magnetic portion and/or the second magnetic portion are formed as a ring shape. This facilitates assembly of the magnetic circuit system, and is conducive to improving assembly efficiency.

In a possible design manner of the first aspect, the magnetic circuit system further includes a first magnetically conductive yoke and a second magnetically conductive yoke, the first magnetically conductive yoke is arranged on a surface of a side of the first magnet close to the first diaphragm assembly, and the second magnetically conductive yoke is arranged on surfaces of sides of the second magnet and the third magnet close to the first diaphragm assembly. In this way, by constraining a magnetic force line through the first magnetically conductive yoke and the second magnetically conductive yoke, strength of a magnetic current in the first magnetic gap between the first magnetic portion and the second magnetic portion can be increased, and driving strength for the first diaphragm assembly is improved. In addition, the second magnet and the third magnet may be integrated through the second magnetically conductive yoke, which is conducive to entire assembly of the kernel.

In a possible design manner of the first aspect, the magnetic circuit system further includes a secondary magnet, the secondary magnet is arranged on a surface of a side of the second magnetically conductive yoke away from the second magnet, and a magnetization direction of the secondary magnet is opposite to the magnetization direction of the second magnet. In this way, a magnetic force line emitted by the second magnet may be constraint from diverging outward through the secondary magnet, so that strength of a magnetic current in the second magnetic gap can be increased, and the driving strength for the first diaphragm assembly is further improved.

In a possible design manner of the first aspect, the magnetic circuit system further includes a fourth magnet. The fourth magnet is arranged between the third magnet and the second magnet, and the second magnet and the third magnet are both spaced apart from the fourth magnet. A magnetization direction of the fourth magnet is perpendicular to the magnetization direction of the third magnet, a magnetic polarity of an end of the fourth magnet close to the third magnet is the same as a magnetic polarity of an end of the third magnet close to the first diaphragm assembly, and a magnetic polarity of an end of the fourth magnet away from the third magnet is the same as a magnetic polarity of an end of the third magnet away from the first diaphragm assembly. In this way, the second magnet, the third magnet, and the fourth magnet may form a Halbach array, so that magnetic forces can be centralized toward the second voice coil, and driving strength for the second diaphragm assembly is improved. The Halbach array is an arrangement of permanent magnets. The permanent magnets in different magnetization directions are arranged in a specific order, so that a magnetic field on one side of the Halbach array is significantly strengthened and a magnetic field on the other side is significantly weakened.

In a possible design manner of the first aspect, the first magnetic portion is a magnetically conductive yoke, the second magnetic portion is the second magnet, and the first magnetic gap is defined between the magnetically conductive yoke and the second magnet. In this way, a magnetic loop can also be formed between the first magnetic portion and the second magnetic portion. When the first voice coil is energized, the first voice coil drives the first diaphragm assembly to vibrate under action of a magnetic field in the first magnetic gap.

In a possible design manner of the first aspect, a support assembly is further included. The support assembly includes a support plate, a first support frame, and a second support frame. The support plate is located on a surface of a side of the first magnetic portion away from the first diaphragm assembly, the first magnetic portion and the second magnetic portion are both connected to the support plate, an avoidance hole is provided on an inner side of the support plate, and an orthographic projection of the third magnetic portion on the support plate is located in the avoidance hole. The first support frame is located between the first diaphragm assembly and the support plate, the first diaphragm assembly is supported on the first support frame, and the first support frame is connected to the magnetic circuit system. The second support frame is located on a side of the support plate away from the magnetic circuit system, the second diaphragm assembly is supported on the second support frame, and the first support frame, the support plate, and the second support frame are relatively fastened.

The support assembly provided in this embodiment of this application can fasten relative positions between components in the magnetic circuit system, and relative positions between the components in the magnetic circuit system and the first diaphragm assembly as well as the second diaphragm assembly. The support assembly is of a sandwich structure formed by the support plate, the first support frame, and the second support frame. Therefore, this is conducive to reducing difficulty in machining the support assembly, and reducing difficulty in assembling the support assembly in the kernel.

In a possible design manner of the first aspect, the support plate is made of stainless steel.

In a possible design manner of the first aspect, the support plate is made of a magnetically conductive material. The magnetic circuit system further includes a third magnetically conductive yoke, and the third magnetically conductive yoke is arranged on a surface of a side of the third magnetic portion close to the second diaphragm assembly. A second magnetic gap is defined between the support plate and the third magnetically conductive yoke, and the second voice coil is arranged in the second magnetic gap. In this way, by constraining a magnetic force line through the support plate and the third magnetically conductive yoke, strength of a magnetic current in the second magnetic gap between the second magnetic portion and the third magnetic portion can be increased, and driving strength for the second diaphragm assembly is improved.

In a possible design manner of the first aspect, a protrusion portion protruding toward the magnetic circuit system is arranged on the second diaphragm assembly, and the second voice coil is arranged on the protrusion portion. The protrusion portion may support the second voice coil. In this way, it is convenient to arrange the second voice coil in the second magnetic gap, so that the second voice coil is closer to a magnetic field region with relatively large magnetic field strength, sensitivity of the kernel can be improved, and a structure of the kernel is simplified without arranging another support member configured to support the second voice coil on the second diaphragm assembly.

In a possible design manner of the first aspect, the protrusion portion is formed by protruding a part of a second dome toward the magnetic circuit system.

In a possible design manner of the first aspect, a first sound cavity is defined among the first diaphragm assembly, the first support frame, and the magnetic circuit system, and a first sound output channel in communication with the first sound cavity is provided on the first support frame.

In a possible design manner of the first aspect, the kernel further includes a first cover body. The first cover body is connected to a surface of a side of the support plate away from the magnetic circuit system, the second diaphragm assembly is arranged in the first cover body, a second sound cavity is defined between the second diaphragm assembly and the first cover body, and a second sound output channel in communication with the second sound cavity is provided on the first cover body. This facilitates sound transmission of the kernel.

In a possible design manner of the first aspect, a sound output direction of the first sound output channel is the same as a sound output direction of the second sound output channel. Therefore, during assembly, both the first sound output channel and the second sound output channel may be toward a sound output hole of the earphone, so that sounds generated through vibration of the first diaphragm assembly and the second diaphragm assembly are smoothly transmitted to the outside of the earphone, thereby improving the sound quality of the earphone.

In a possible design manner of the first aspect, the first support frame is formed as a hollow columnar structure. A partial surface of an inner wall surface of the first support frame is depressed outward to form a step portion. The inner wall surface of the first support frame is connected to an outer wall surface of the first magnetically conductive yoke. The first magnetic portion may be arranged on the step portion, and a surface of a side of the step portion toward a center of the kernel is connected to an outer wall surface of the first magnetic portion. Therefore, the magnetic circuit system may be fastened to the first support frame through the first magnetic portion and the first magnetically conductive yoke.

In a possible design manner of the first aspect, a first fastening lug is arranged on an outer peripheral wall of the first support frame, one end of the first fastening lug is connected to the first support frame, and the other end of the first fastening lug extends toward a direction away from the first support frame. In this way, when the kernel is assembled on a housing, the first fastening lug may be connected to the housing, to conveniently fasten the kernel into the housing.

In a possible design manner of the first aspect, a second fastening lug is arranged on the first cover body. One end of the second fastening lug is connected to one end of a first side plate away from a first cover plate, and the other end of the second fastening lug extends toward a direction away from the first side plate. In this way, when the kernel is assembled on the housing, the second fastening lug may be connected to the housing, to fasten the kernel to the housing, which improves reliability of connection between the kernel and the housing.

In a possible design manner of the first aspect, the kernel further includes a second cover body, the second cover body is located on a side of the first diaphragm assembly away from the magnetic circuit system, and a cavity is defined between the second cover body and the first diaphragm assembly. Therefore, the first diaphragm assembly may be protected by the second cover body, avoiding damage of the first diaphragm assembly.

In a possible design manner of the first aspect, a vent configured to communicate an internal space and an external space of the cavity is provided on the second cover body.

In a possible design manner of the first aspect, a sound output tube is arranged on the first cover body, one end of the sound output tube is in communication with the second sound output channel, and the other end of the sound output tube extends towards a direction away from the second sound cavity. In this way, when the kernel is assembled in a shell of the speaker module, a distance between the second sound output channel and a voice output channel of the speaker module may be shortened, which is conducive to reducing interference between sounds in the first sound output channel and the second sound output channel, and is conducive to improving sound quality of the speaker module.

According to a second aspect, this application provides a speaker module. The speaker module includes a shell and the kernel according to any one of the foregoing technical solutions, and the kernel is arranged in the shell.

Because the speaker module provided in this application includes the kernel according to the foregoing technical solutions, the speaker module and the kernel can resolve the same technical problem, and achieve the same effect.

According to a third aspect, this application provides a speaker module. The speaker module includes a shell and a kernel. A voice output channel is formed on the shell, a sound output tube is arranged on a first cover body of the kernel, one end of the sound output tube is in communication with a second sound output channel, and the other end of the sound output tube extends toward a direction away from a second sound cavity.

In a possible implementation of the third aspect, the sound output tube extends into the voice output channel, and at least a part of an outer wall of the sound output tube is spaced apart from an inner wall of the voice output channel. In this way, a communication channel may be defined between the outer wall of the sound output tube and the inner wall of the voice output channel, and a sound from the first sound output channel may be transmitted through the communication channel spaced apart from the sound output channel to the outside of the shell. Because a sound in a first sound cavity and a sound in the second sound cavity are respectively transmitted through the communication channel and a sound output tubeline that are spaced apart to the outside of the shell, interference between the sound in the first sound cavity and the sound in the second sound cavity is effectively avoided, and a sound effect of the speaker module is effectively improved.

According to a fourth aspect, some embodiments of this application provide an earphone. The earphone includes a housing and the speaker module according to the foregoing technical solutions. The speaker module is arranged in the housing, and the voice output channel of the speaker module is in communication with a sound output hole.

In a possible implementation of the fourth aspect, the housing includes a front housing and a rear housing, the sound output hole is formed on the front housing, the rear housing is connected to the front housing, the rear housing and the front housing enclose a containing space, and the speaker module is arranged in the containing space. In this way, the housing is configured as the front housing and the rear housing, facilitating machining and assembly of the housing.

In a possible implementation of the fourth aspect, a main board of the earphone is arranged in the containing space, the speaker module is electrically connected to the main board, and the speaker module is located on a side of the main board close to the sound output hole. In this way, the speaker module may obtain an audio electrical signal of music, voice, and the like, and may prevent the main board from interfering with sound output of the speaker module.

In a possible implementation of the fourth aspect, a first accommodating cavity is formed in the front housing, and the speaker module is arranged in the first accommodating cavity.

In a possible implementation of the fourth aspect, the front housing includes a main body portion and an extension portion. The extension portion is located on a side of the main body portion, and extends to a direction away from the main body portion. The first accommodating cavity is formed in the main body portion. The sound output hole is formed on the extension portion.

In a possible implementation of the fourth aspect, the rear housing includes a mask body and a rod body, the mask body is connected to the front housing, and the rod body is arranged on a side of the mask body away from the front housing. A second accommodating cavity is formed in the mask body, the second accommodating cavity is in communication with the first accommodating cavity, and the first accommodating cavity and the second accommodating cavity together form the containing space.

Because the speaker module provided in this application includes the speaker module according to any one of the foregoing technical solutions, the speaker module and the speaker module can resolve the same technical problem, and achieve the same effect.

REFERENCE NUMERALS

Figure 1:
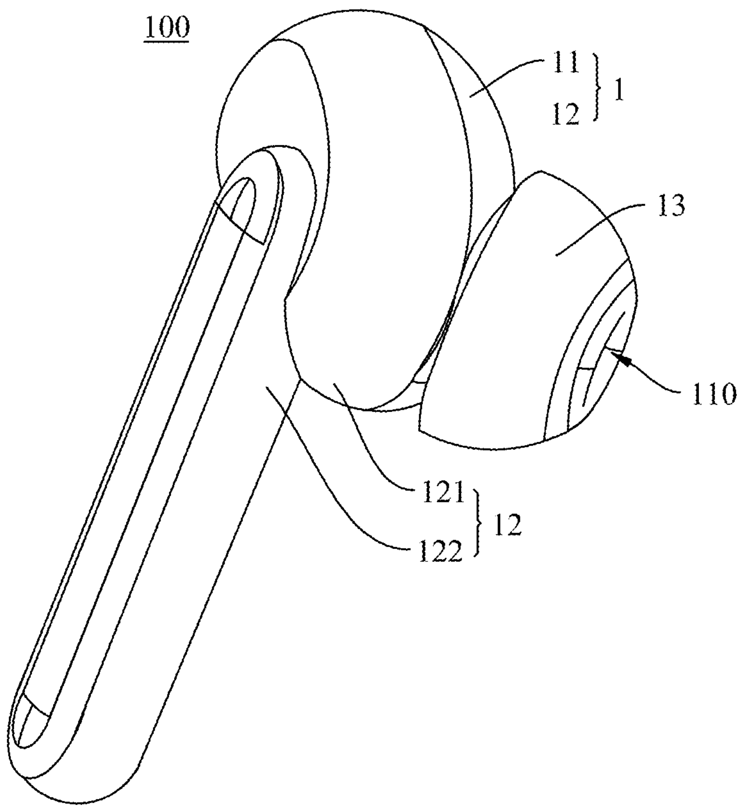
FIG. 1 is a three-dimensional view of an earphone according to some embodiments of this application.

100, earphone;

1, housing; 10, containing space; 101, first accommodating cavity; 102, second accommodating cavity; 11, front housing; 110, sound output hole; 111, main body portion; 112, extension portion; 1121, limiting rib; 11*a*, first connecting rib; 11*b*, second connecting rib; 11*c*, hollow region; 12, rear housing; 121, mask body; 122, rod body; 1221, charging contact; 13, contact sleeve;

2, main board;

3, battery;

4, speaker module; 41, shell; 41*a*, voice output channel; 41*b*, communication channel; 42, kernel; 420*a*, diaphragm; 420*b*, voice coil; 420*c*, first magnetic circuit system; 420*d*, frame;

421*a*, high-frequency kernel; 4211*a*, high-frequency diaphragm assembly; 4212*a*, high-frequency voice coil; 4213*a*, high-frequency magnetic circuit system; 4214*a*, first frame; 421*b*, low-frequency kernel; 4211*b*, low-frequency diaphragm assembly; 4212*b*, low-frequency voice coil; 4213*b*, low-frequency magnetic circuit system; 4214*b*, second frame;

422, first diaphragm assembly; 4221, first diaphragm sheet; 4221*a*, first corrugated rim; 4221*b*, first connecting portion; 4222, first dome; 423, first voice coil;

424, second diaphragm assembly; 4241, second diaphragm sheet; 4241*a*, second corrugated rim; 4241*b*, second connecting portion; 4242, second dome; 424*a*, protrusion portion; 425, second voice coil;

426, magnetic circuit system; 4261, first magnetic portion; 4262, second magnetic portion; 4262*a*, accommodating space; 4263, third magnetic portion; 4264, fourth magnet; 4265, secondary magnet; 4266, first magnetically conductive yoke; 4267, second magnetically conductive yoke; 4268, third magnetically conductive yoke;

K1, first magnetic gap; K2, second magnetic gap;

427, support assembly; 4271, support plate; 4271*a*, avoidance hole; 4271*b*, rear leakage hole; 4272, first support frame; 4272*a*, first sound output channel; 4272*b*, first fastening lug; 4272*c*, step portion; 4273, second support frame; 4273*a*, embedding groove;

428, first cover body; 428*a*, second sound output channel; 4281, first cover plate; 4282, first side plate; 4283, second fastening lug; 4284, sound output tube;

429*a*, first sound cavity; 429*b*, second sound cavity; 429*c*, cavity; 429*d*, cavity;

430, second cover body; 430*a*, vent; 4301, second cover plate; 4302, second side plate; and 4303, third fastening lug.

DESCRIPTION OF EMBODIMENTS

In embodiments of this application, terms "first", "second", "third", and "fourth" are used merely for the purpose of description, and shall not be construed as indicating or implying relative importance or implying a quantity of indicated technical features. Therefore, features defining "first", "second", "third", and "fourth" may explicitly or implicitly include one or more such features.

In embodiments of this application, terms "include", "comprise", or any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Unless otherwise specified, elements defined by the sentence "including one" does not exclude that there are still other same elements in the processes, methods, objects, or apparatuses.

"And/or" in embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

This application provides an earphone 100. The earphone 100 may be a wireless earphone 100, or may be a wired earphone 100. The earphone 100 may be used with an electronic device such as a mobile phone, a tablet computer, or a notebook computer, to convert a received electrical signal into mechanical vibration, thereby implementing a sound-emitting function of the earphone 100.

Figure 2:
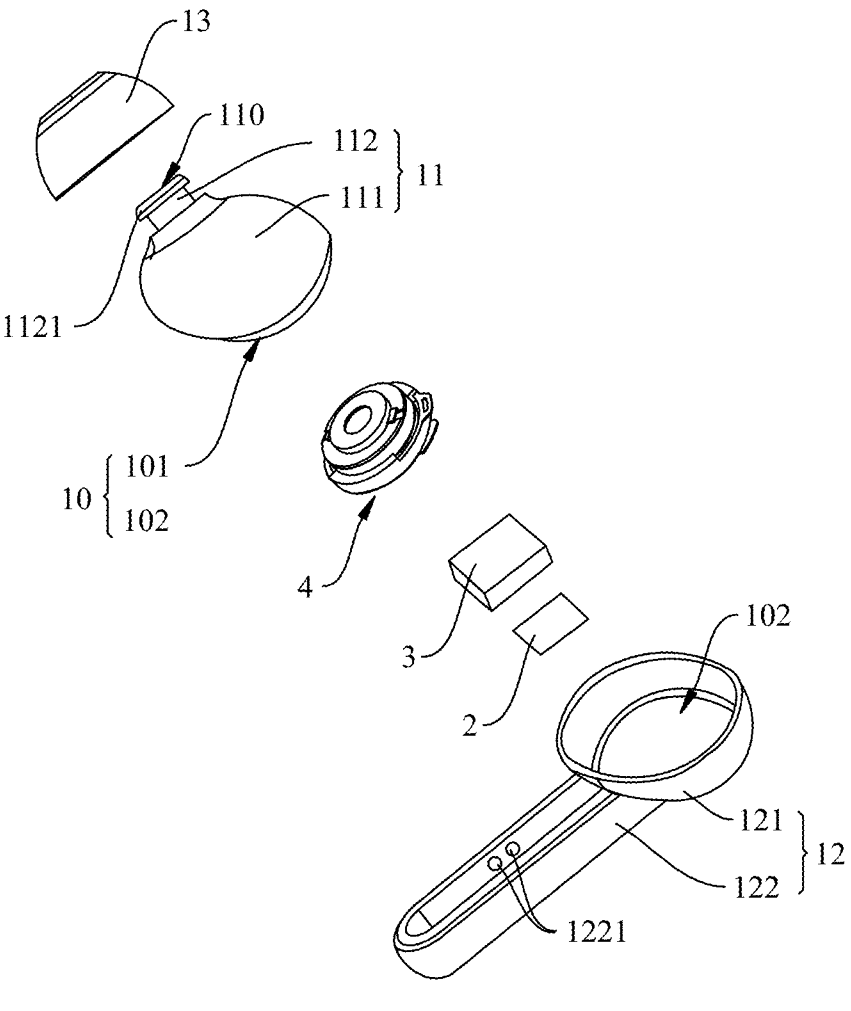
FIG. 2 is an exploded view of the earphone shown in FIG. 1.

FIG. 1 is a schematic diagram of a structure of an earphone 100 according to an embodiment of this application, and FIG. 2 is an exploded view of a structure of the earphone 100 in FIG. 1. The earphone 100 shown in FIG. 1 and FIG. 2 is described by using a wireless earphone as an example. In this example, the earphone 100 includes a housing 1, a main board 2, a battery 3, and a speaker module 4.

It may be understood that FIG. 1, FIG. 2, and the following related drawings only schematically show some components included in the earphone 100, and actual shapes, actual sizes, actual positions, and actual structures of the components are not limited in FIG. 1, FIG. 2, and the following drawings.

The housing 1 may be used as a carrier of functional devices of the earphone 100, and a shape of the housing 1 may be adapted to a shape of a human ear, to improve user wearing comfort. Referring to FIG. 1 and FIG. 2, the housing 1 may include a front housing 11 and a rear housing 12.

In this application, the front housing 11 is the housing 1 on a side of the earphone 100 facing the human ear during use, and the rear housing 12 is the housing 1 on a side of the earphone 100 facing away from the human ear during use. The front housing 11 may be connected to the rear housing 12, and the front housing 11 and the rear housing 12 enclose a containing space 10. In this implementation, the front housing 11 may be fixedly connected to the rear housing 12 in a buckling manner. In another implementation, the front housing 11 may be fixedly connected to the rear housing 12 through glue or an adhesive tape.

In this embodiment, the front housing 11 and the rear housing 12 may be made of hard plastic, so that the front housing 11 and the rear housing 12 have specific structural strength. In addition, the front housing 11 and the rear housing 12 are generally directly exposed to an external environment. Therefore, the front housing 11 and the rear housing 12 may also have wear-resistant, corrosion-resistant, anti-scratch, and other performance, or a layer of functional material for wear-resistance, corrosion-resistance, and anti-scratch may be coated on outer surfaces of the front housing 11 and the rear housing 12 (that is, an outer surface of the earphone 100). In addition, in some embodiments, the front housing 11 and the rear housing 12 may be designed with the same color, to improve appearance consistency of the earphone 100. In some other embodiments, the front housing 11 and the rear housing 12 may alternatively be designed with different colors, to present different appearance effects. In addition, corresponding logos (LOGOs) may be arranged on the front housing 11 and the rear housing 12, to beautify the appearance of the earphone 100 and improve brand recognition.

It should be noted that in embodiments of this application, all directional indications (for example, up, down, left, right, front, and back) are used only for explaining relative positional relationships, movement situations, and the like between various components in a specific posture (as shown in the accompanying drawings). If the specific posture changes, the directional indications change accordingly.

Referring to FIG. 2, a first accommodating cavity 101 configured to accommodate the speaker module 4 is formed in the front housing 11, a sound output hole 110 is provided on the front housing 11, and a sound may be conducted through the sound output hole 110 to the outside of the earphone 100. The front housing 11 may include a main body portion 111 and an extension portion 112, and the main body portion 111 and the extension portion 112 may be integrally formed. The extension portion 112 may be located on a side of the main body portion 111, and extend toward a direction away from the main body portion 111. Referring to FIG. 2, the first accommodating cavity 101 may be formed in the main body portion 111, and the sound output hole 110 may be formed on the extension portion 112. It may be understood that in some other embodiments, the front housing 11 may alternatively not include the extension portion 112.

To improve the user wearing comfort of the earphone 100, a contact sleeve 13 may be further arranged on the earphone 100. The contact sleeve 13 may be configured to come in contact with the user's ear. For example, the contact sleeve 13 may be enclosed on an outer side wall of the extension portion 112, and the contact sleeve 13 may have a similar shape to a shape of human ear canal, to improve wearing adaptability of the earphone 100. In addition, the contact sleeve 13 may be made of a flexible material such as silicone gel or rubber, to improve the user wearing comfort of the earphone 100. Referring to FIG. 2, a limiting rib 1121 may be further formed on the outer side wall of the extension portion 112, so that when the contact sleeve 13 is enclosed on the outer side wall of the extension portion 112, the limiting rib 1121 can abut against the contact sleeve 13, to limit the contact sleeve 13 and reduce a probability that the contact sleeve 13 naturally falls off from the extension portion 112.

The rear housing 12 may include a mask body 121 and a rod body 122. The mask body 121 and the rod body 122 may be of an integral structure, or may be of a separated structure. The mask body 121 may be connected to the front housing 11. The rod body 122 may be arranged on a side of the mask body 121 away from the front housing 11. A second accommodating cavity 102 may be formed in the mask body 121, the second accommodating cavity 102 may be in communication with the first accommodating cavity 101, and the first accommodating cavity 101 and the second accommodating cavity 102 together form the containing space 10. A charging contact 1221 may be arranged on the rod body 122, to charge the earphone 100 through an external power supply.

Still referring to FIG. 2, the main board 2, the battery 3, and the speaker module 4 are accommodated in the containing space 10.

The main board 2 is configured to integrate a main control chip, a Bluetooth chip, and the like, and may be configured for charging management, signal transmission, and the like. Specifically, the main board 2 may be arranged in the second accommodating cavity 102. A space in communication with the second accommodating cavity 102 may be formed in the rod body 122, and a corresponding charging line may be arranged in the space. The charging line electrically connects the charging contact 1221 to the main board 2 in the second accommodating cavity 102.

The main board 2 may be a rigid printed circuit board, a flexible printed circuit board, or a rigid-flexible printed circuit board. The main control main board 2 may be an FR-4 dielectric board, a Rogers (Rogers) dielectric board, a mixed dielectric board of FR-4 and Rogers, or the like. Herein, FR-4 is a code name of a flame-resistant material grade, and the Rogers dielectric board is a high-frequency board.

The battery 3 is configured to supply power to electronic components such as the main board 2 and the speaker module 4 in the earphone 100. The battery 3 may be located on a side of the main board 2 close to the first accommodating cavity 101.

The speaker module 4 may be mounted in the first accommodating cavity 101. The speaker module 4 is electrically connected to the main board 2, to obtain an audio electrical signal of music, or voice, or the like. The speaker module 4 may be an electroacoustic transduction component, configured to convert the audio electrical signal into a sound signal. The sound signal is conducted from the sound output hole 110 on the extension portion 112 to the outside of the earphone 100. The speaker module 4 is located on a side of the main board 2 close to the sound output hole 110. In this way, the main board 2 is prevented from interfering with sound output of the speaker module 4.

It may be understood that in addition to being configured to mount and accommodate the main board 2, the battery 3, and the speaker module 4, the containing space 10 may be further configured to mount functional components such as an antenna, a communication unit, and a sensor, to implement wireless connection between the earphone 100 and other electronic devices. It may be understood that in some other embodiments, the functional components such as the battery 3, the main board 2, the antenna, the communication unit, and the sensor may alternatively be arranged in the space in the rod body 122, which is not limited in embodiments of this application.

Figure 3:
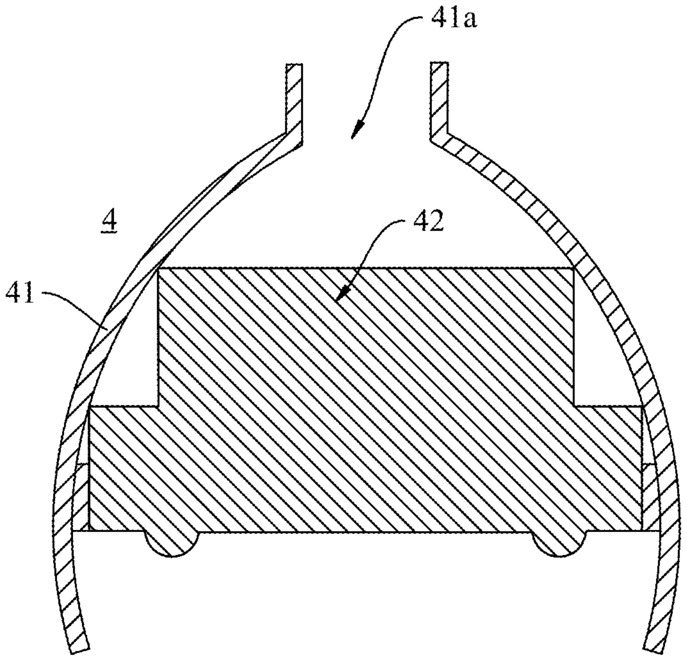
FIG. 3 is a partial cross-sectional view of a speaker module according to some embodiments of this application.

FIG. 3 is a cross-sectional view of a speaker module 4 in the earphone 100 shown in FIG. 1. In this embodiment, the speaker module 4 includes a shell 41 and a kernel 42. The kernel 42 is arranged in the shell 41, and the shell 41 can fasten and protect the kernel 42. A voice output channel 41*a* is provided on the shell 41, and a sound generated by the kernel 42 can be transmitted through the voice output channel 41*a* to the outside of the shell 41. It may be understood that at least a part of the shell 41 of the speaker module 4 may be formed by the housing 1 of the earphone 100, or the shell 41 of the speaker module 4 may be a component independent of the housing 1 of the earphone 100. When the at least a part of the shell 41 of the speaker module 4 is formed by the housing 1 of the earphone 100, the voice output channel 41*a* may be formed by the sound output hole 110 or the extension portion 112 on the housing 1.

Figure 4:
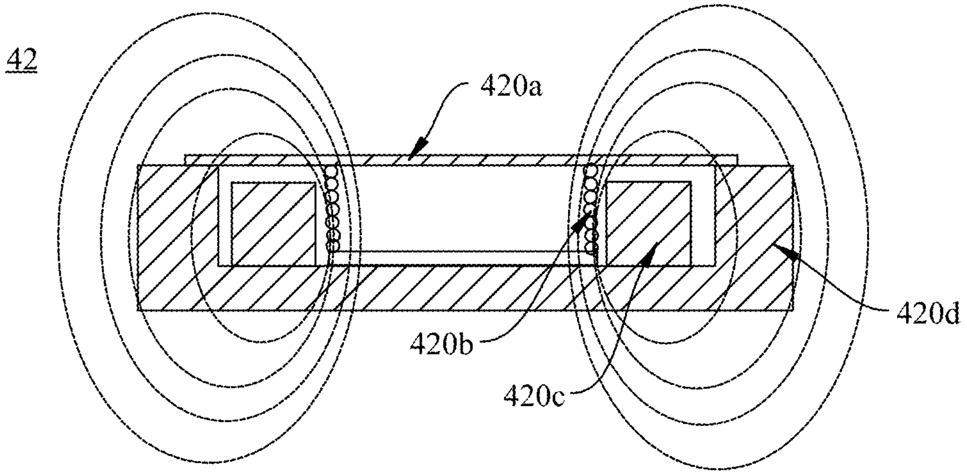
FIG. 4 is a cross-sectional view of a kernel according to some embodiments of this application.

FIG. 4 is a schematic structural cross-sectional view of a kernel 42 of a speaker module 4 according to some embodiments. The kernel 42 includes a diaphragm 420*a*, a voice coil 420*b* fixedly connected to the diaphragm 420*a*, a first magnetic circuit system 420*c* arranged on a side of the diaphragm 420*a*, and a frame 420*d* configured to mount the diaphragm 420*a* and the first magnetic circuit system 420*c*. When the kernel 42 is used in the speaker module 4 shown in FIG. 3, the kernel 42 is fastened to an inner wall of the shell 41 through the frame 420*d*, and the diaphragm 420*a* may separate the shell 41 into a front cavity and a rear cavity. The voice coil 420*b*, the first magnetic circuit system 420*c*, and the frame 420*d* are located in the rear cavity, the diaphragm 420*a* and an inner wall surface of the shell 41 enclose a front cavity of the speaker module 4, and a sound output channel in communication with the front cavity is formed on the shell 41. The voice coil 420*b* generates an induced magnetic field after being energized, and is displaced under action of a magnetic force of the first magnetic circuit system 420*c*, to drive the diaphragm 420*a* to vibrate, thereby pushing air in the front cavity to vibrate and generate a sound wave, where the sound wave is output from the voice output channel.

In this embodiment, the kernel 42 adopts a moving coil vibration system, which is cheap and technically mature, and has good performance. However, a vibration mass of the moving coil vibration system is large and transient characteristics are not good, and mass distribution, membrane compliance, and asymmetric distribution of a BL electromagnetic driving force produce different degrees of wag vibration and split vibration of different frequencies, resulting in serious peaks and valleys in a high-frequency response, which causes low expansion of high frequency.

Figure 5:
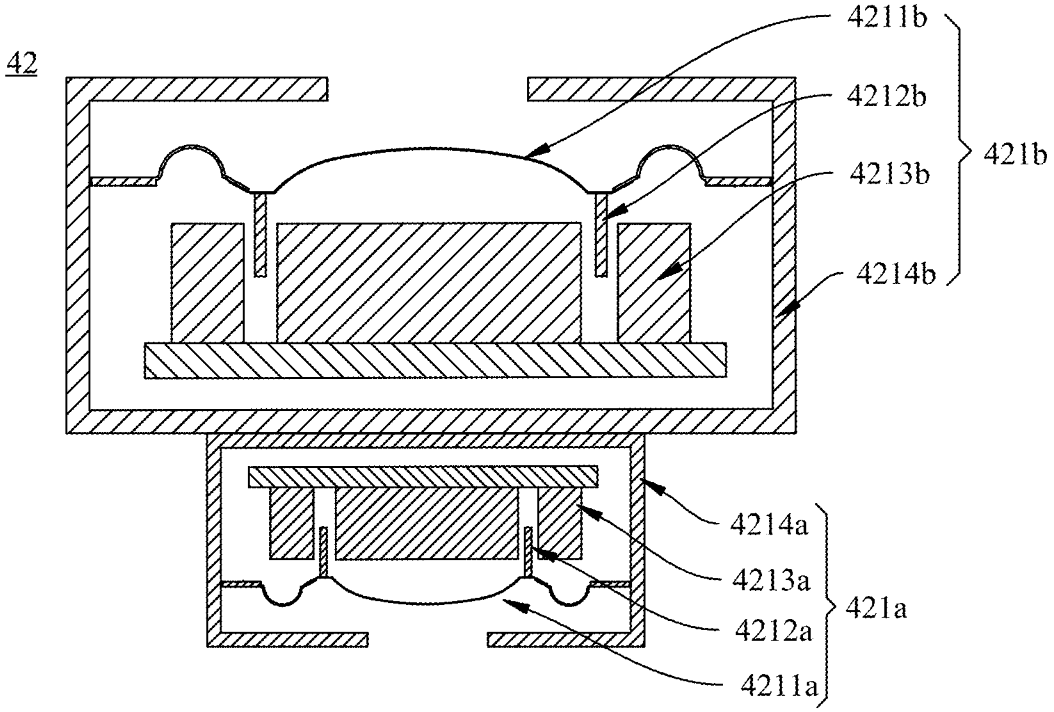
FIG. 5 is a cross-sectional view of a kernel according to some other embodiments of this application.

To resolve the technical problem of the low expansion of the high frequency of the moving coil vibration system, FIG. 5 is a schematic structural diagram of a kernel 42 according to some other embodiments of this application. In this embodiment, the kernel 42 includes a high-frequency kernel 421*a* and a low-frequency kernel 421*b*, and the high-frequency kernel 421*a* and the low-frequency kernel 421*b* are stacked. Specifically, referring to FIG. 5, the high-frequency kernel 421*a* includes a high-frequency diaphragm assembly 4211*a*, a high-frequency voice coil 4212*a* fixedly connected to the high-frequency diaphragm assembly 4211*a*, a high-frequency magnetic circuit system 4213*a* arranged on a side of the high-frequency diaphragm assembly 4211*a*, and a first frame 4214*a* configured to mount the high-frequency diaphragm assembly 4211*a* and the high-frequency magnetic circuit system 4213*a*. The high-frequency voice coil 4212*a* cooperates with the high-frequency magnetic circuit system 4213*a* to drive the high-frequency diaphragm assembly 4211*a* to vibrate. The low-frequency kernel 421*b* is arranged on a side of the high-frequency kernel 421*a*. The low-frequency kernel 421*b* includes a low-frequency diaphragm assembly 4211*b*, a low-frequency voice coil 4212*b* fixedly connected to the low-frequency diaphragm assembly 4211*b*, a low-frequency magnetic circuit system 4213*b* arranged on a side of the low-frequency diaphragm assembly 4211*b*, and a second frame 4214*b* configured to mount the low-frequency diaphragm assembly 4211*b* and the low-frequency magnetic circuit system 4213*b*. The low-frequency voice coil 4212*b* cooperates with the low-frequency magnetic circuit system 4213*b* to drive the low-frequency diaphragm assembly 4211*b* to vibrate. The low-frequency diaphragm assembly 4211*b* is located on a side of the low-frequency magnetic circuit system 4213*b* away from the high-frequency kernel 421*a*.

In this embodiment, the high-frequency kernel 421*a* and the low-frequency kernel 421*b* are integrated in the kernel 42, so that the earphone 100 can take into account performance both in a low-frequency sound range and a high-frequency sound range. However, the kernel 42 in this embodiment has a large volume, and occupies a large space, which is not conducive to assembling the kernel 42 in the earphone 100 with a limited space.

Figure 6:
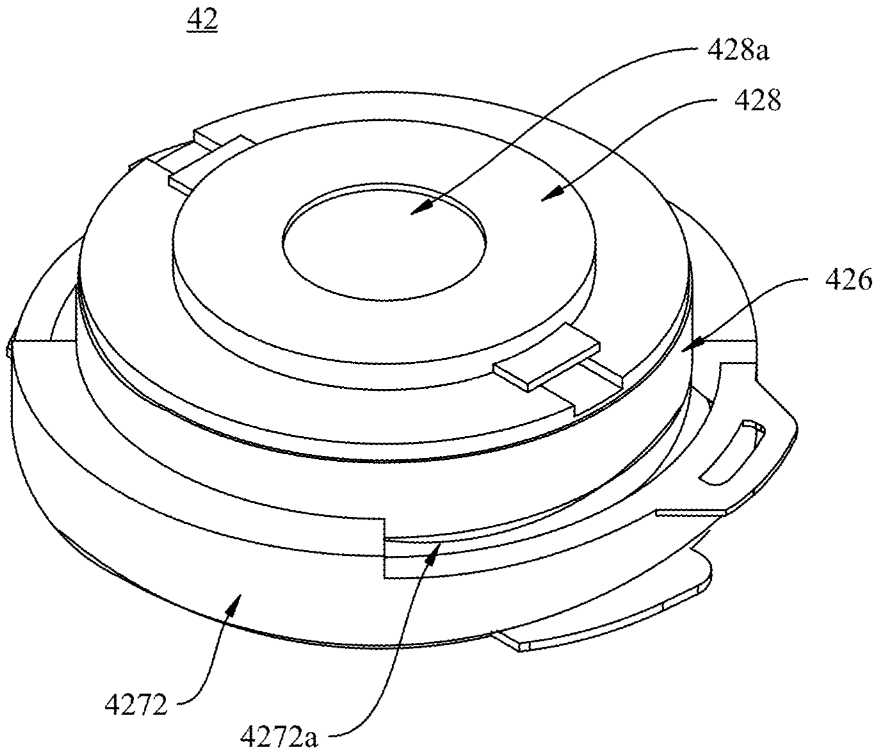
FIG. 6 is a three-dimensional view of a kernel according to still some other embodiments of this application.
Figure 7:
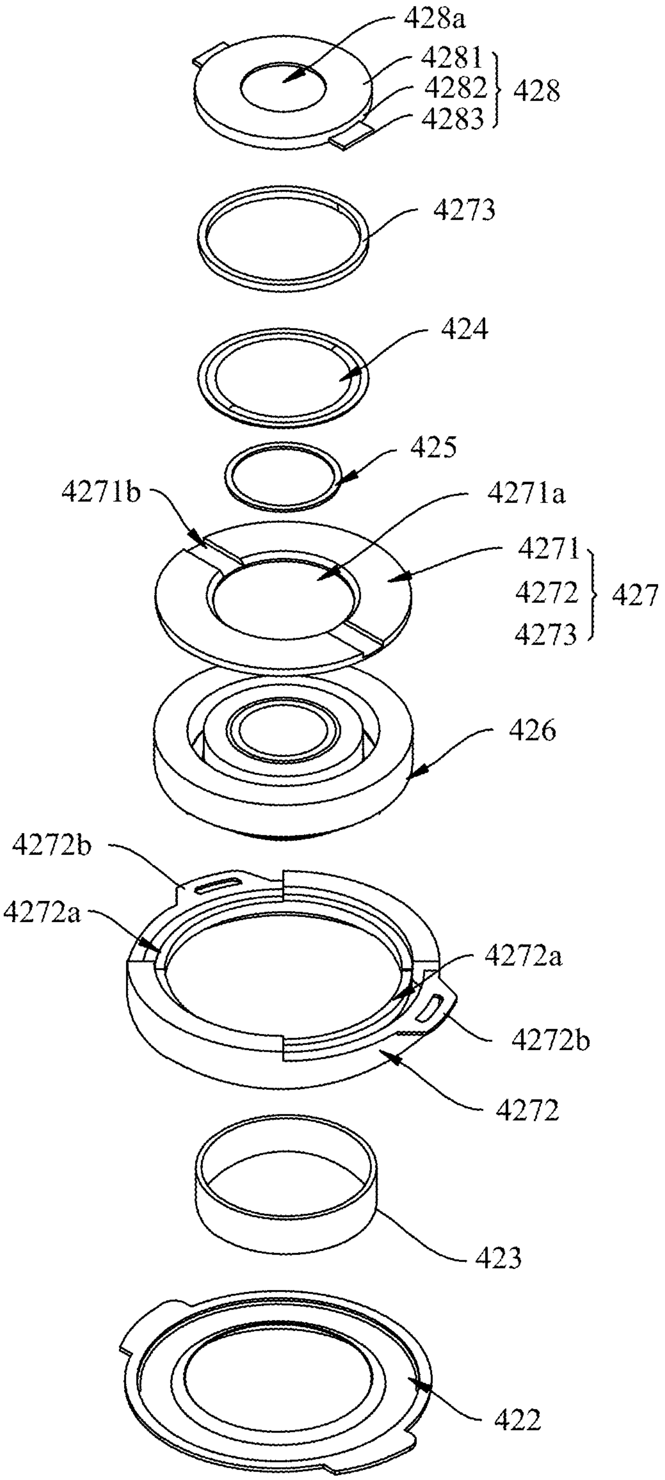
FIG. 7 is an exploded view of the kernel shown in FIG. 6.
Figure 8:
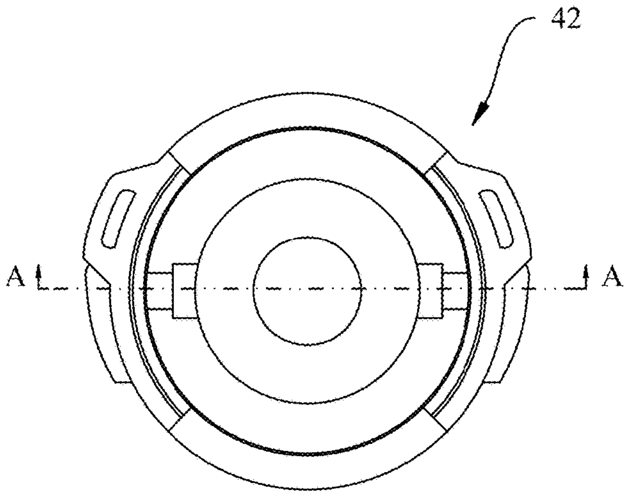
FIG. 8 is a top view of the kernel shown in FIG. 6.
Figure 9:
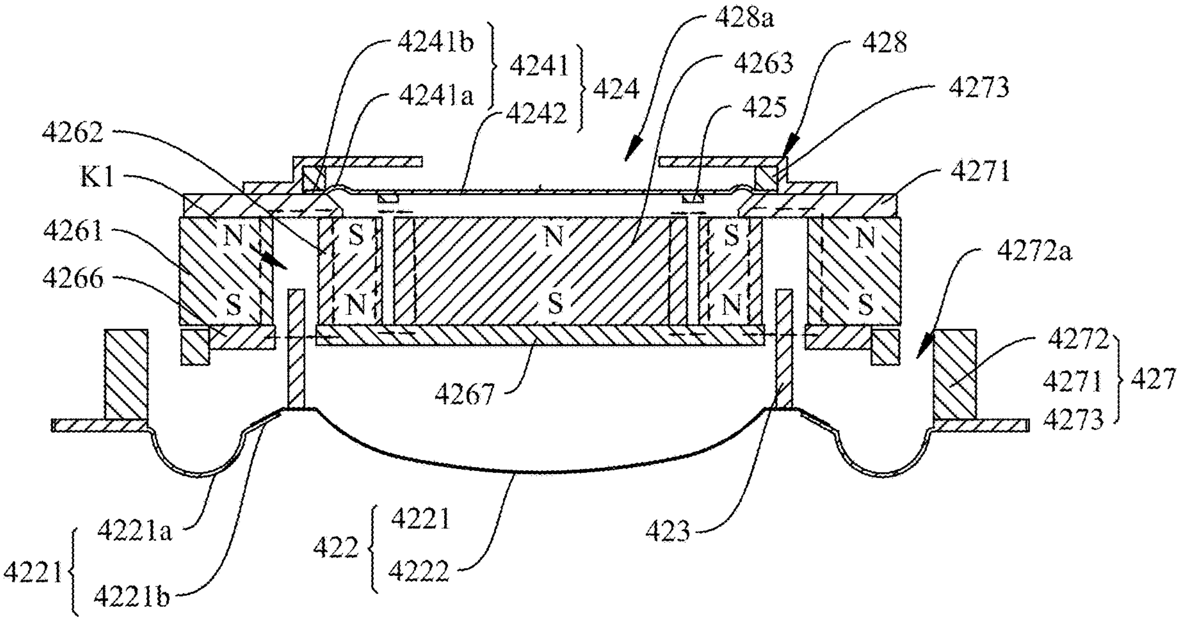
FIG. 9 is a cross-sectional view along a line A-A in FIG. 8.

To resolve the foregoing technical problems, referring to FIG. 6 to FIG. 9, FIG. 6 is a schematic three-dimensional structural diagram of a kernel 42 according to still some other embodiments of this application, FIG. 7 is an exploded view of the kernel 42 shown in FIG. 6, FIG. 8 is a top view of the kernel 42 shown in FIG. 6, and FIG. 9 is a schematic diagram of a cross-sectional structure along a line A-A in FIG. 8. In this embodiment, the kernel 42 includes a first vibration system, a second vibration system, and a magnetic circuit system 426.

It should be noted that FIG. 6 to FIG. 9 merely show examples of some components included in the kernel 42, and actual shapes, actual sizes, actual positions, and actual configurations of these components are not limited by FIG. 6 to FIG. 9 and the following accompanying drawings.

Specifically, referring to FIG. 7 and FIG. 9, the first vibration system includes a first diaphragm assembly 422 and a first voice coil 423. The first voice coil 423 is fastened to the first diaphragm assembly 422. The second vibration system includes a second diaphragm assembly 424 and a second voice coil 425. The second voice coil 425 is fastened to the second diaphragm assembly 424. The first vibration system and the second vibration system are respectively located on two opposite sides of the magnetic circuit system 426. The first diaphragm assembly 422, the second diaphragm assembly 424, the first voice coil 423, and the second voice coil 425 may be arranged on the same center line.

In some embodiments, the second voice coil 425 is a planar voice coil, and the second voice coil 425 may be manufactured through winding or circuit printing. The planar voice coil has a small thickness and a small mass, and a vibration mass of the planar voice coil is extremely light, so that transient state and high frequency characteristics are good, and while a thickness of the kernel 42 is reduced, sound quality of the kernel 42 in a high frequency band can be improved.

Figure 10:
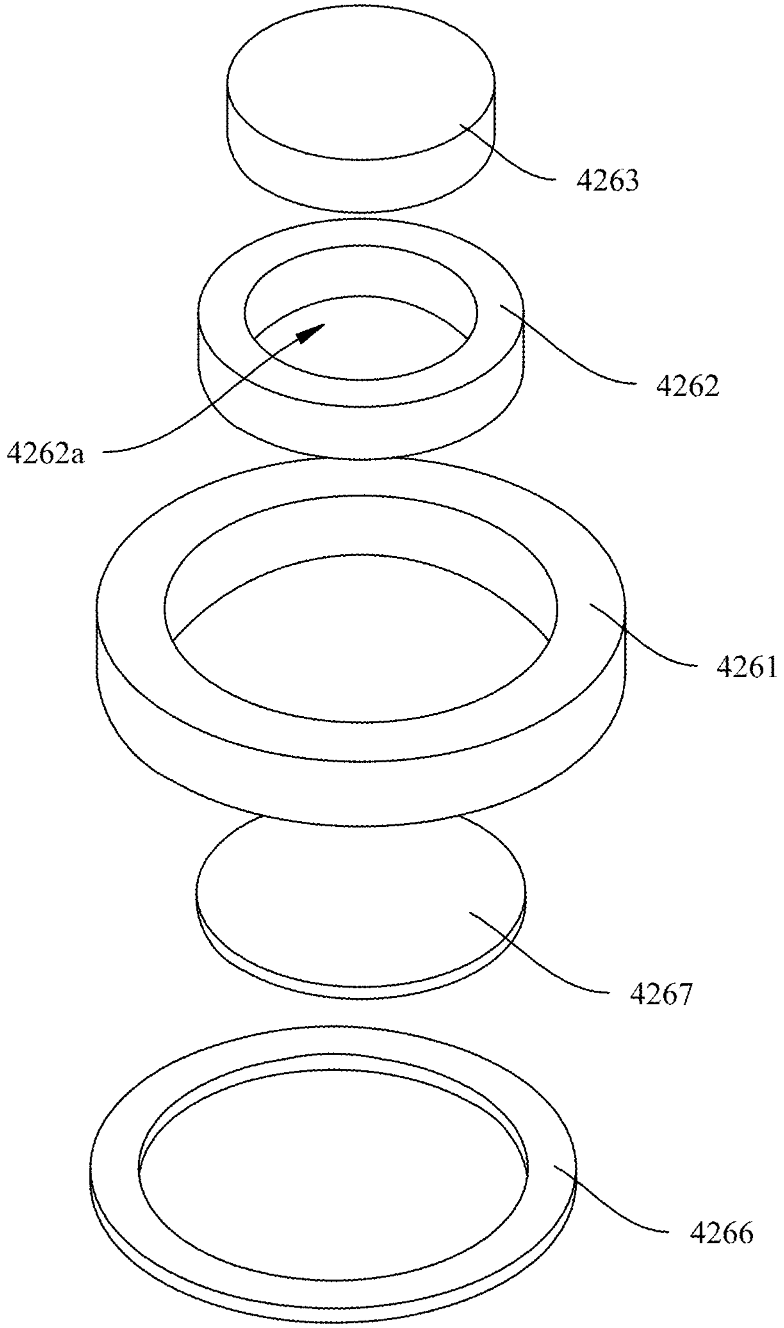
FIG. 10 is an exploded view of the kernel shown in FIG. 8.

Referring to FIG. 9 and FIG. 10. FIG. 10 is an exploded view of a magnetic circuit system 426 of the kernel 42 shown in FIG. 6. The magnetic circuit system 426 includes a first magnetic portion 4261 and a second magnetic portion 4262, the first magnetic portion 4261 surrounds a periphery of the second magnetic portion 4262, the first magnetic portion 4261 is spaced apart from the second magnetic portion 4262, and the first voice coil 423 cooperates with the first magnetic portion 4261 and the second magnetic portion 4262 to drive the first diaphragm assembly 422 to vibrate. An inner side of the second magnetic portion 4262 includes an accommodating space 4262*a*. The magnetic circuit system 426 further includes a third magnetic portion 4263. The third magnetic portion 4263 is arranged in the accommodating space 4262*a*, and is spaced apart from the second magnetic portion 4262. The second voice coil 425 cooperates with the second magnetic portion 4262 and the third magnetic portion 4263 to drive the second diaphragm assembly 424 to vibrate.

Specifically, the first magnetic portion 4261 and the second magnetic portion 4262 may form a first magnetic loop configured to drive the first voice coil 423 to vibrate, and the second magnetic portion 4262 and the third magnetic portion 4263 may form a second magnetic loop configured to drive the second voice coil 425 to vibrate. In this way, the accommodating space 4262*a* is formed on the inner side of the second magnetic portion 4262, and the third magnetic portion 4263 is arranged in the accommodating space 4262*a*, so that the second magnetic portion 4262 can respectively cooperate with the first magnetic portion 4261 and the third magnetic portion 4263, to form the first magnetic loop and the second magnetic loop that are spaced apart in a radial direction of the kernel 42. In this way, the first diaphragm assembly 422 and the second diaphragm assembly 424 may be simultaneously driven to vibrate by the magnetic circuit system 426 without increasing a thickness of the magnetic circuit system 426. In addition, the second voice coil 425 is set to the planar voice coil, so that a thickness of the kernel 42 can be further reduced, and sound quality of the kernel 42 in a high frequency band can also be improved, thereby reducing a sense of division of a timbre of the kernel 42 and improving sound quality of the earphone 100. In this way, the thickness of the kernel 42 in this application may be increased by only 0.2 mm to 1 mm (for example, 0.2 mm, 0.3 mm, 0.5 mm, 0.8 mm, 0.9 mm, or 1 mm) compared with a thickness of a kernel with a single diaphragm assembly, and both thinness and audio performance of the kernel 42 can be taken into account.

In some embodiments, an effective area of the second diaphragm assembly 424 is less than an effective area of the first diaphragm assembly 422. The effective area of the first diaphragm assembly 422 refers to an area of a part of the first diaphragm assembly 422 that can push air to move, and the effective area of the second diaphragm assembly 424 refers to an area of a part of the second diaphragm assembly 424 that can push the air to move. The effective area of the diaphragm assembly is related to a vibration frequency. A smaller effective area of the diaphragm assembly indicates a higher vibration frequency. Correspondingly, a larger effective area of the diaphragm assembly indicates a lower vibration frequency. The effective area of the second diaphragm assembly 424 is less than the effective area of the first diaphragm assembly 422, so that a vibration frequency of the second diaphragm assembly 424 is higher than a vibration frequency of the first diaphragm assembly 422. Because the effective area of the first diaphragm assembly 422 and the effective area of the second diaphragm assembly 424 are different, the first diaphragm assembly 422 and the second diaphragm assembly 424 may generate different vibration frequencies, so that the kernel 42 has good performance in sound ranges at different frequencies, and the sound quality of the kernel 42 is improved while ensuring a small volume of the kernel 42.

For example, the first diaphragm assembly 422 may be a low-frequency diaphragm assembly, and the second diaphragm assembly 424 may be a high-frequency diaphragm assembly. In this way, the kernel 42 has good performance in both a low-frequency sound range and a high-frequency sound range, and it is conducive to improving the sound quality of the kernel 42.

In some embodiments, the first vibration system is a moving coil vibration system, and the second vibration system is a planar vibration system. The second diaphragm assembly 424 in the planar vibration system is made of a high polymer material with good flexibility. In this way, when the second voice coil 425 is energized to cause the second diaphragm assembly 424 to be magnetized and vibrate under a force, a tone of a sound produced by the second diaphragm assembly 424 is more mellow and full. Compared with a conventional sound production manner in which an iron sheet drives a metal diaphragm to produce sound, making a tone cold, thin, and hard, the tone of the planar vibration system can be better blended with a tone of the moving coil vibration system, to reduce a sense of division between a high-frequency tone and a low-frequency tone of the kernel 42, thereby effectively improving the sound quality of the earphone 100. In addition, because the planar vibration system is more focused on the high-frequency sound range, the planar vibration system can make up for a shortcoming of insufficient high-frequency extension of the moving coil vibration system, can significantly expand a high-frequency frequency response, and implements significantly improvement in a frequency response in a frequency band of 8 KHz to 40 KHz, so that the earphone 100 can take into account performance both in the low-frequency sound range and the high-frequency sound range.

The following describes a specific structure of the kernel 42 in embodiments of this application.

Referring to FIG. 7 and FIG. 9, the first diaphragm assembly 422 may include a first diaphragm sheet 4221 and a first dome 4222. The first diaphragm sheet 4221 includes a first corrugated rim 4221*a* and a first connecting portion 4221*b* surrounded by the first corrugated rim 4221*a*. The first dome 4222 is stacked on a surface of a side of the first connecting portion 4221*b* close to the magnetic circuit system 426, and is fastened to the first connecting portion 4221*b* through gluing or the like. The first voice coil 423 is fastened to the first dome 4222 through gluing or the like. The effective area of the first diaphragm assembly 422 may be an area enclosed by an outer edge of the first corrugated rim 4221*a*.

The second diaphragm assembly 424 includes a second diaphragm sheet 4241 and a second dome 4242. The second diaphragm sheet 4241 includes a second corrugated rim 4241*a* and a second connecting portion 4241*b* surrounded by the second corrugated rim 4241*a*. The effective area of the second diaphragm assembly 424 may be an area enclosed by an outer edge of the second corrugated rim 4241*a*. The second dome 4242 and the second diaphragm sheet 4241 may be integrally formed. The second voice coil 425 is fastened to the second dome 4242 through gluing or the like.

For the magnetic circuit system 426, in some embodiments, referring to FIG. 9 and FIG. 10, the first magnetic portion 4261 is a first magnet, the second magnetic portion 4262 is a second magnet, a first magnetic gap K1 is defined between the first magnet and the second magnet, and at least a part of the first voice coil 423 extends into the first magnetic gap K1. The first magnet may be an iron magnet or a steel magnet. Similarly, the second magnet may also be an iron magnet or a steel magnet. A magnetization direction (a direction from a south pole to a north pole, that is, a direction from an S pole to an N pole) of the first magnet is opposite to a magnetization direction of the second magnet. For example, referring to FIG. 9 and FIG. 10, an end of the first magnet close to the first diaphragm assembly 422 is the S pole, and an end of the first magnet away from the first diaphragm assembly 422 is the N pole. An end of the second magnet close to the first diaphragm assembly 422 is the N pole, and an end of the second magnet away from the first diaphragm assembly 422 is the S pole. In this way, a magnetic loop may be formed between the first magnet and the second magnet. When the first voice coil 423 is energized, the first voice coil 423 drives the first diaphragm assembly 422 to vibrate under action of a magnetic field in a second magnetic gap K2.

Referring to FIG. 10, the first magnet may be formed as a ring, for example, a circular ring. Optionally, the first magnet may be an integral piece, thereby facilitating assembly of the first magnet. In some other embodiments, the first magnet may include a plurality of first sub-magnets that are spaced apart, and the plurality of first sub-magnets surround a periphery of the second magnet.

The second magnet may be formed as a ring, for example, a circular ring. In this way, it is convenient to form the accommodating space 4262*a* in the second magnet. It may be understood that in some other embodiments, the second magnet may include a plurality of second sub-magnets that are spaced apart, and the plurality of second sub-magnets enclose the accommodating space 4262*a*.

Based on the foregoing embodiments, the third magnetic portion 4263 may be a third magnet, and the third magnet may be a magnet or a steel magnet. An outer contour shape of the third magnet may be adapted to a shape of the accommodating space 4262*a*. For example, the third magnet is formed as a cylindrical structure. A magnetization direction of the third magnet is opposite to the magnetization direction of the second magnet. For example, referring to FIG. 9, an end of the third magnet close to the first diaphragm assembly 422 is the S pole, and an end of the third magnet away from the first diaphragm assembly 422 is the N pole. The end of the second magnet close to the first diaphragm assembly 422 is the N pole, and the end of the second magnet away from the first diaphragm assembly 422 is the S pole. In this way, a magnetic loop may be formed between the third magnet and the second magnet. When the second voice coil 425 is energized, the second voice coil 425 drives the second diaphragm assembly 424 to vibrate under action of a magnetic field.

Based on the foregoing embodiments, to enlarge strength of a magnetic current, in some embodiments, referring to FIG. 9, the magnetic circuit system 426 further includes a first magnetically conductive yoke 4266 and a second magnetically conductive yoke 4267. The first magnetically conductive yoke 4266 and the second magnetically conductive yoke 4267 are configured to constrain magnetic leakage of an induction coil from diffusing outward, and may be yoke irons made of stacked silicon steel sheets.

Referring to FIG. 10, the first magnetically conductive yoke 4266 may be formed as a ring. The second magnetically conductive yoke 4267 may be formed as a plate structure. The first magnetically conductive yoke 4266 may be arranged on a surface of a side of the first magnet close to the first diaphragm assembly 422 through gluing, engagement, threaded connection, or the like. The second magnetically conductive yoke 4267 may be arranged on surfaces of sides of the second magnet and the third magnet close to the first diaphragm assembly 422 through gluing, engagement, threaded connection, or the like. In this way, by constraining a magnetic force line through the first magnetically conductive yoke 4266 and the second magnetically conductive yoke 4267, strength of a magnetic current in the first magnetic gap K1 between the first magnetic portion 4261 and the second magnetic portion 4262 can be increased, and driving strength for the first diaphragm assembly 422 is improved. In addition, the second magnet and the third magnet may be integrated through the second magnetically conductive yoke 4267, which is conducive to entire assembly of the kernel 42.

It may be understood that in some other embodiments, the magnetic circuit system 426 may alternatively not include the first magnetically conductive yoke 4266 and the second magnetically conductive yoke 4267.

Figure 11:
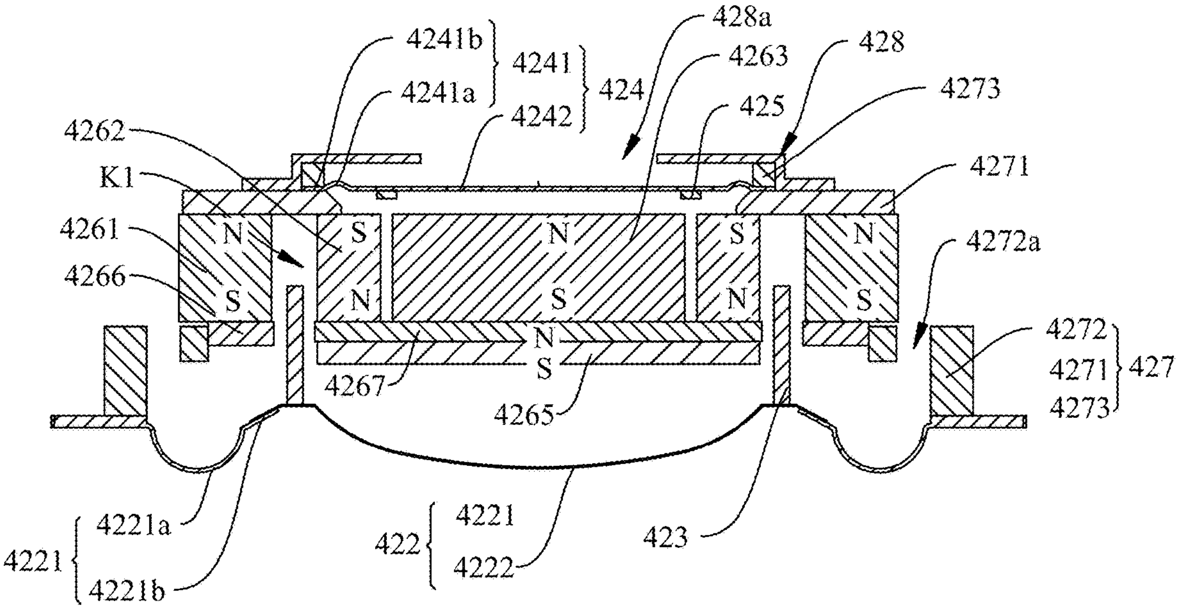
FIG. 11 is a cross-sectional view of a kernel according to still some other embodiments of this application.

Further, in some embodiments, FIG. 11 is a cross-sectional view of a kernel 42 according to some other embodiments of this application. The magnetic circuit system 426 of the kernel 42 in this embodiment further includes a secondary magnet 4265 in addition to the first magnet, the second magnet, the third magnet, the first magnetically conductive yoke 4266, and the second magnetically conductive yoke 4267 in the embodiment shown in FIG. 9. The secondary magnet 4265 may be an iron magnet or a steel magnet. Referring to FIG. 11, the secondary magnet 4265 is arranged on a surface of a side of the second magnetically conductive yoke 4267 away from the second magnet and the third magnet. A magnetization direction of the secondary magnet 4265 is opposite to the magnetization direction of the second magnet, and the magnetization direction of the secondary magnet is the same as the magnetization direction of the third magnet.

For example, referring to FIG. 11, the end of the second magnet close to the first diaphragm assembly 422 is the N pole, and the end of the second magnet away from the first diaphragm assembly 422 is the S pole. An end of the secondary magnet 4265 close to the second magnet is an N pole, and an end of the secondary magnet 4265 away from the second magnet is the S pole. In this way, a magnetic force line emitted by the second magnet may be constraint from diverging outward through the secondary magnet 4265, so that strength of a magnetic current in the second magnetic gap K2 can be increased, and the driving strength for the first diaphragm assembly 422 is further improved.

In some embodiments, the secondary magnet 4265 is formed as a circular plate structure. The surface of the side of the second magnetically conductive yoke 4267 away from the second magnet is defined as a reference plane, an orthographic projection of the secondary magnet 4265 on the reference plane is a first projection, an orthographic projection of the second magnet on the reference plane is a second projection, and an orthographic projection of the third magnet on the reference plane is a third projection. The first projection covers the second projection and the third projection. In this way, an area of the secondary magnet 4265 may be increased, to increase a constraint effect of the secondary magnet 4265 on the magnetic force line emitted by the second magnet.

In some embodiments, the secondary magnet 4265 may alternatively be formed as a circular ring structure. In this embodiment, the first projection may cover the second projection. It may be understood that the first projection may completely overlap the second projection, or may partially overlap the second projection. In this way, the secondary magnet 4265 may also constrain the magnetic force line emitted by the second magnet from diverging outward.

Figure 12:
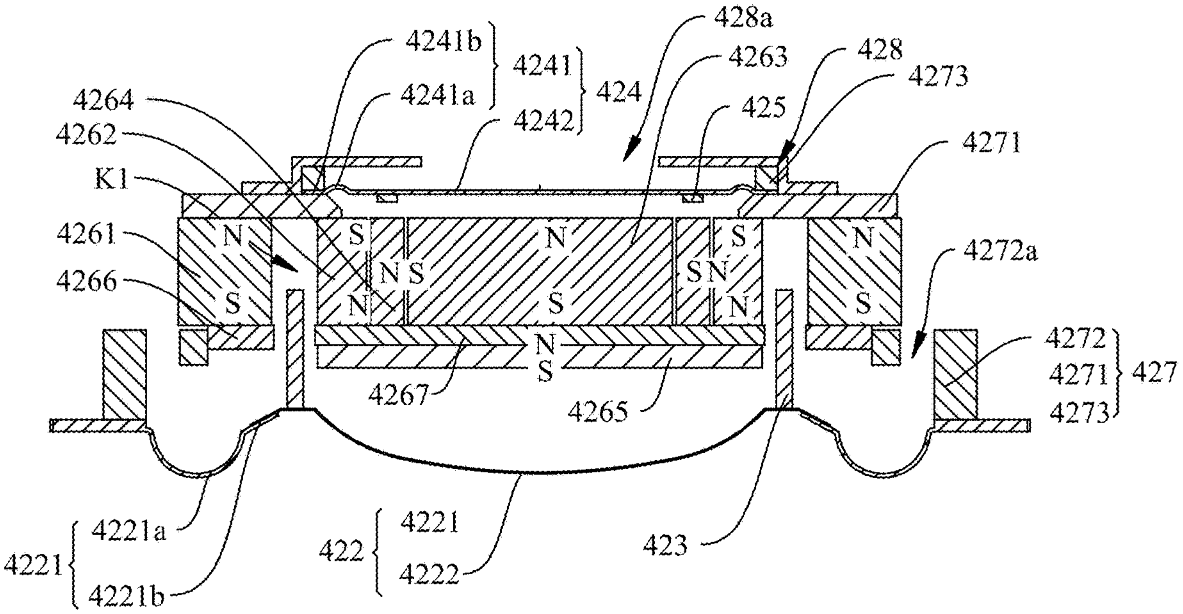
FIG. 12 is a cross-sectional view of a kernel according to still some other embodiments of this application.

In some embodiments, FIG. 12 is a cross-sectional view of a kernel 42 according to still some other embodiments of this application. The magnetic circuit system 426 of the kernel 42 in this embodiment further includes a fourth magnet 4264 in addition to the first magnet, the second magnet, the third magnet, the first magnetically conductive yoke 4266, and the second magnetically conductive yoke 4267 in the embodiment shown in FIG. 9. The fourth magnet 4264 may be an iron magnet or a steel magnet. Referring to FIG. 12, the fourth magnet 4264 is arranged between the second magnet and the third magnet, the fourth magnet 4264 is spaced apart from the second magnet, and the fourth magnet 4264 is also spaced apart from the third magnet. A magnetization direction of the fourth magnet 4264 is perpendicular to the magnetization direction of the third magnet, a magnetic polarity of an end of the fourth magnet 4264 close to the third magnet is the same as a magnetic polarity of an end of the third magnet close to the first diaphragm assembly 422, and a magnetic polarity of an end of the fourth magnet away from the third magnet is the same as a magnetic polarity of an end of the third magnet away from the first diaphragm assembly.

For example, referring to FIG. 12, the magnetization direction of the third magnet may extend in an axial direction (namely, a direction from the first diaphragm assembly to the second diaphragm assembly) of the magnetic circuit system 426, and the magnetization direction of the third magnet may extend in a radial direction of the magnetic circuit system 426. The end of the third magnet close to the first diaphragm assembly 422 is the S pole, and the end of the third magnet away from the first diaphragm assembly 422 is the N pole. An end of the fourth magnet 4264 close to the second magnet is the N pole, and an end of the fourth magnet 4264 close to the third magnet is the S pole. In this way, the second magnet, the third magnet, and the fourth magnet 4264 may form a Halbach array, so that magnetic forces can be centralized toward the second voice coil 425 and driving strength for the second diaphragm assembly 424 is improved. The Halbach array is an arrangement of permanent magnets. The permanent magnets in different magnetization directions are arranged in a specific order, so that a magnetic field on one side of the Halbach array is significantly strengthened and a magnetic field on the other side is significantly weakened.

Figure 13:
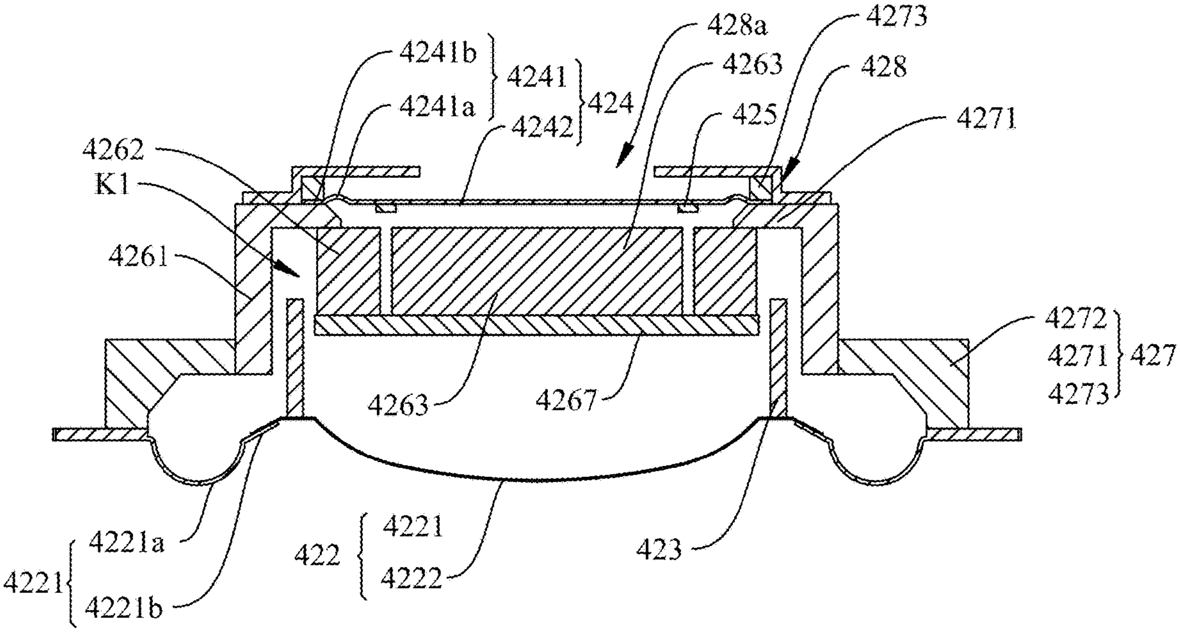
FIG. 13 is a cross-sectional view of a kernel according to still some other embodiments of this application.

In still some other embodiments, FIG. 13 is a cross-sectional view of a kernel 42 according to still some other embodiments of this application. A difference between the kernel 42 in this embodiment and the kernel 42 in the embodiment shown in FIG. 9 lies in: the first magnetic loop in this embodiment is a single magnetic portion. Specifically, in this embodiment, the first magnetic portion 4261 is a magnetically conductive yoke, the second magnetic portion 4262 is the second magnet, and the first magnetic gap K1 is defined between the magnetically conductive yoke and the second magnet. In this way, a magnetic loop can also be formed between the first magnetic portion 4261 and the second magnetic portion 4262. When the first voice coil 423 is energized, the first voice coil 423 drives the first diaphragm assembly 422 to vibrate under action of a magnetic field in the first magnetic gap K1.

Further, the kernel 42 further includes a support assembly 427. The support assembly 427 is configured to fix relative positions between components in the magnetic circuit system 426, and further fix relative positions between the components in the magnetic circuit system 426 and the first diaphragm assembly 422 as well as the second diaphragm assembly 424. A plurality of structural forms of the support assembly 427 meet this condition. In some embodiments, referring to FIG. 9 again, the support assembly 427 further includes a support plate 4271, a first support frame 4272, and a second support frame 4273. The first support frame 4272, the support plate 4271, and the second support frame 4273 are fastened relative to each other.

The support plate 4271 is located on a surface of a side of the first magnetic portion 4261 away from the first diaphragm assembly 422, and an avoidance hole 4271*a* is provided on an inner side of the support plate 4271. An orthographic projection of the third magnetic portion 4263 on the support plate 4271 is located in the avoidance hole 4271*a*. For example, referring to FIG. 7 and FIG. 9, the support plate 4271 may be formed as a ring, and the inner side of the support plate 4271 is hollow to form the avoidance hole 4271*a*. In this way, the support plate 4271 may be prevented from affecting the second magnetic loop formed by the second magnetic portion 4262 and the third magnetic portion 4263, so that the magnetic force line in the second magnetic loop can be applied to the second voice coil 425, to provide a driving force for the second voice coil 425.

Both the first magnetic portion 4261 and the second magnetic portion 4262 are connected to the support plate 4271. The first magnetic portion 4261 and the second magnetic portion 4262 may be fastened to the support plate 4271 through gluing, engagement, threaded connection, or the like. The support plate 4271 is mainly configured to support the first magnetic portion 4261 and the second magnetic portion 4262.

In some embodiments, referring to FIG. 9, FIG. 11, and FIG. 12, the support plate 4271 is made of a non-magnetically conductive material. In these embodiments, the second voice coil 425 may be arranged in the avoidance hole 4271*a*. Because a support effect directly depends on structural strength of the support plate 4271, a thickness of the support plate 4271 may be large to ensure the structural strength of the support plate 4271. However, this increases the thicknesses of the kernel 42 and the speaker module 4. To avoid this problem, the support plate 4271 may be made of a material having relatively large rigidity (for example, stainless steel), so that both the structural strength and the thickness are taken into consideration.

Figure 14:
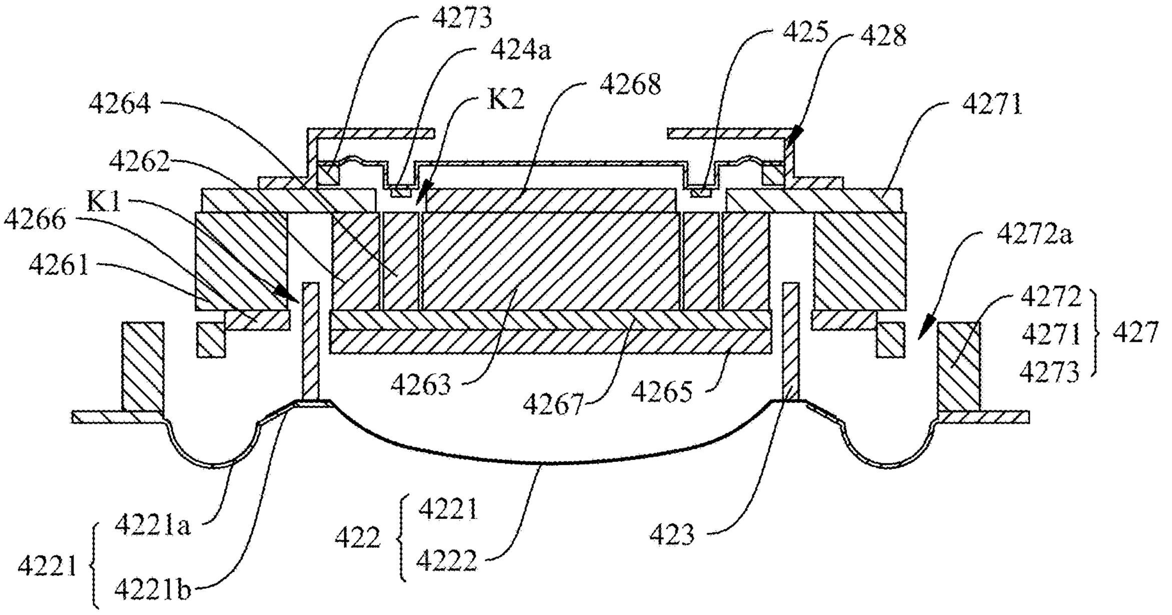
FIG. 14 is a cross-sectional view of a kernel according to still some other embodiments of this application.

In some other embodiments, referring to FIG. 14, the support plate 4271 is made of a magnetically conductive material. In this embodiment, the magnetic circuit system 426 of the support plate 4271 further includes a third magnetically conductive yoke 4268. A second magnetic gap K2 is defined between the support plate 4271 and the third magnetically conductive yoke 4268, and the second voice coil 425 is arranged in the second magnetic gap K2. The support plate 4271 and the third magnetically conductive yoke 4268 are configured to constrain the magnetic leakage of the induction coil from diffusing outward, and may be yoke irons made of stacked silicon steel sheets.

The third magnetically conductive yoke 4268 may be arranged on a surface of a side of the third magnet close to the second diaphragm assembly 424 through gluing, engagement, threaded connection, or the like. In this way, by constraining a magnetic force line through the support plate 4271 and the third magnetically conductive yoke 4268, strength of a magnetic current in the second magnetic gap K2 between the second magnetic portion 4262 and the third magnetic portion 4263 can be increased, and driving strength for the second diaphragm assembly 424 is improved.

Referring to FIG. 14, based on the foregoing embodiments, a protrusion portion 424*a* protruding toward the magnetic circuit system 426 may be arranged on the second diaphragm assembly 424, and the second voice coil 425 is arranged on the protrusion portion 424*a*. The protrusion portion 424*a* may be formed as a ring, and the protrusion portion 424*a* may support the second voice coil 425. The protrusion portion 424*a* may be formed by protruding a part of the second dome 4242 toward the magnetic circuit system 426. In this way, it is convenient to arrange the second voice coil 425 in the second magnetic gap K2, so that the second voice coil 425 is closer to a magnetic field region with relatively large magnetic field strength, sensitivity of the kernel 42 can be improved, and a structure of the kernel 42 is simplified without arranging another support member configured to support the second voice coil 425 on the second diaphragm assembly 424.

Referring to FIG. 14, the first support frame 4272 is located between the first diaphragm assembly 422 and the support plate 4271. The first diaphragm assembly 422 is supported on the first support frame 4272. Specifically, a periphery of an edge of the first diaphragm assembly 422 is fastened to a periphery of the first support frame 4272 through gluing, engagement, threaded connection, or the like, to support the first diaphragm assembly 422.

Figure 15:
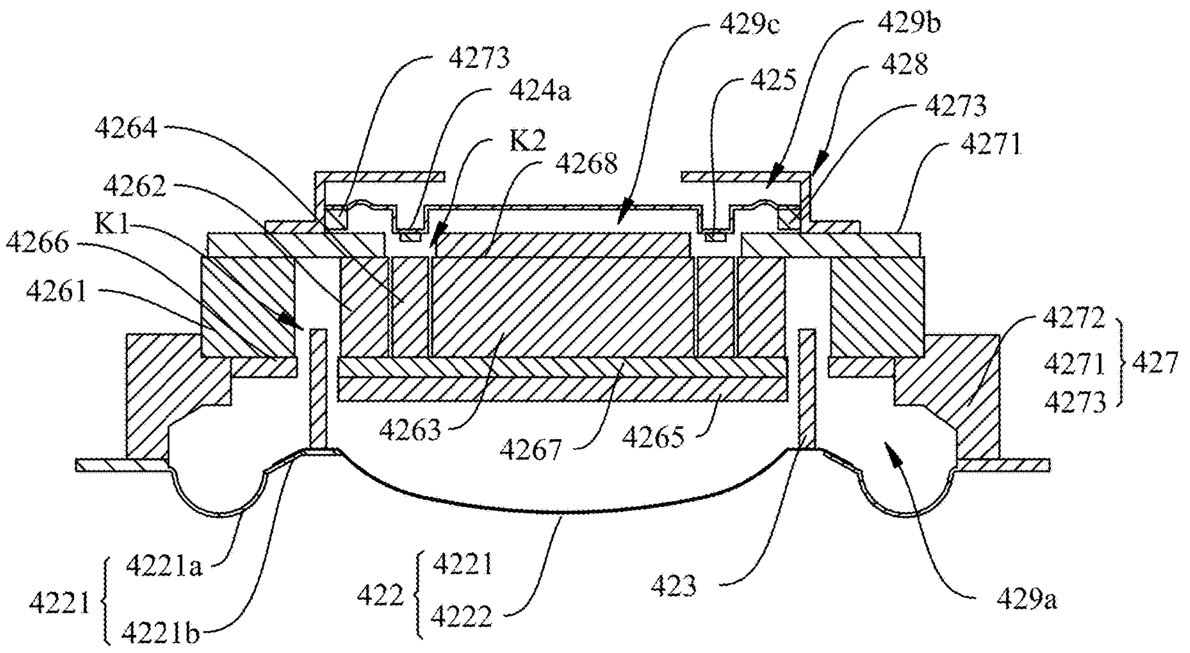
FIG. 15 is another cross-sectional view of the kernel shown in FIG. 14.
Figure 16:
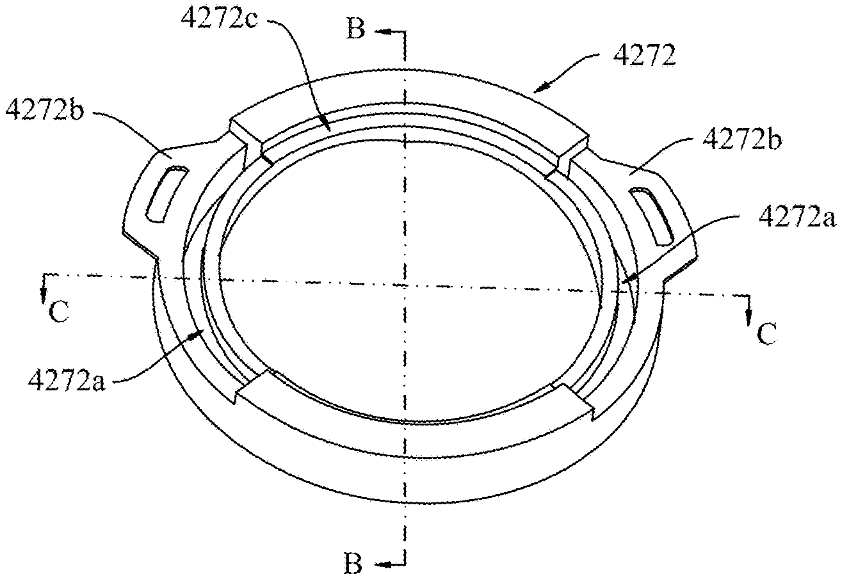
FIG. 16 is a three-dimensional view of a first support frame of a kernel according to some embodiments of this application.

FIG. 15 is another cross-sectional view of the kernel 42 shown in FIG. 14. FIG. 16 is a three-dimensional view of a first support frame 4272 of a kernel 42 according to this application. The first support frame 4272 may be formed as a ring, and the first support frame 4272 may be connected to the magnetic circuit system 426. Specifically, the first support frame 4272 may be connected to the first magnetic portion 4261 and/or the first magnetically conductive yoke 4266. A first sound cavity 429*a* may be defined among the first support frame 4272, the first diaphragm assembly 422, and the magnetic circuit system 426.

For example, referring to FIG. 16, the first support frame 4272 is formed as a hollow columnar structure. A partial surface of an inner wall surface of the first support frame 4272 is depressed outward to form a step portion 4272*c*. The inner wall surface of the first support frame 4272 is connected to an outer wall surface of the first magnetically conductive yoke 4266. The first magnetic portion 4261 may be arranged on the step portion 4272*c*, and a surface of a side of the step portion 4272*c* toward a center of the kernel is connected to an outer wall surface of the first magnetic portion 4261. Therefore, the magnetic circuit system 426 may be fastened to the first support frame 4272 through the first magnetic portion 4261 and the first magnetically conductive yoke 4266.

The inner wall surface of the first support frame 4272 refers to a wall surface of a side of the first support frame 4272 toward the center of the kernel 42. The outer wall surface of the first magnetic portion 4261 refers to a wall surface of a side of the first magnetic portion 4261 away from the center of the kernel 42. The outer wall surface of the first magnetically conductive yoke 4266 refers to a wall surface of a side of the first magnetically conductive yoke 4266 away from the center of the kernel 42.

Referring to FIG. 14 and FIG. 16, a first sound output channel 4272*a* is provided on the first support frame 4272. The first sound output channel 4272*a* is in communication with the first sound cavity 429*a*, and an opening direction of the first sound output channel 4272*a* may face away from the first diaphragm assembly 422. A sound generated through vibration of the first diaphragm assembly 422 may be transmitted to the outside of the kernel 42 through the first sound output channel 4272*a*.

Figure 16A:
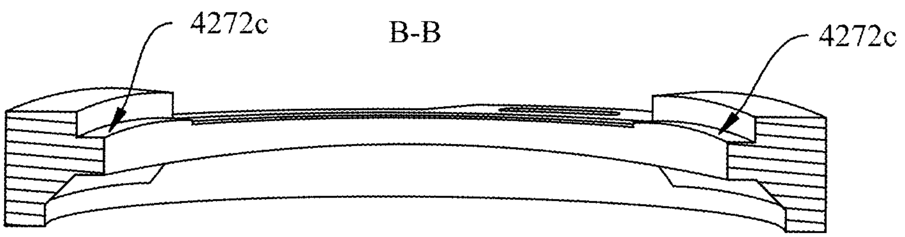
FIG. 16A is a cross-sectional view along a line B-B in FIG. 16.
Figure 16B:
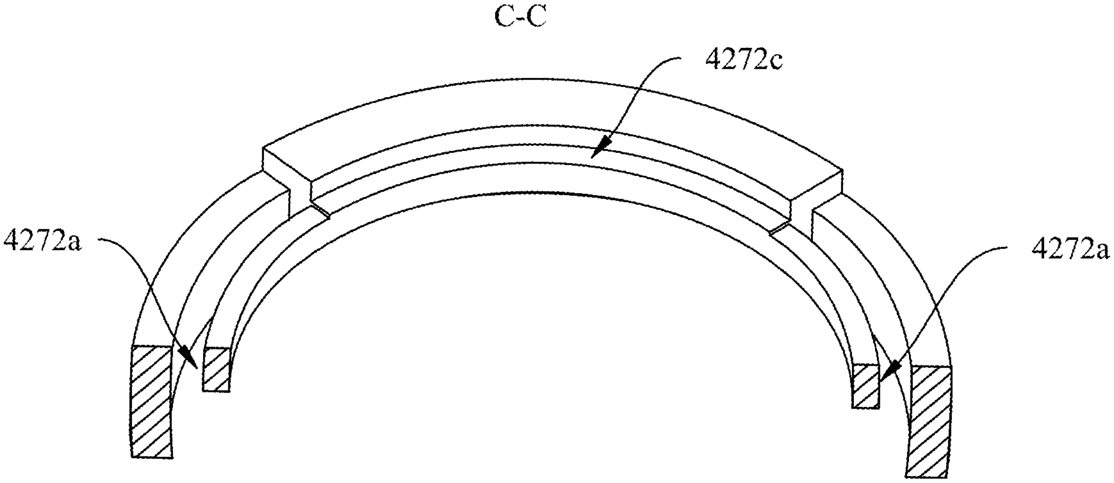
FIG. 16B is a cross-sectional view along a line C-C in FIG. 16.

Referring to FIG. 16A and FIG. 16B, the first sound output channel 4272*a* is formed as a through channel running through end surfaces of two ends of the first support frame 4272 in an axial direction. There may be a plurality of first sound output channels 4272*a*, and the plurality of first sound output channels 4272*a* are provided at intervals in a circumferential direction of the first support frame 4272. The term "a plurality of" in this application means two or more. For example, referring to FIG. 16, there are two first sound output channels 4272*a*, and the two first sound output channels 4272*a* are provided symmetrically with respect to a central axis of the first support frame 4272. In this way, the sound generated through vibration of the first diaphragm assembly 422 can be transmitted to the outside of the kernel 42 more uniformly, thereby improving the sound quality of the kernel 42.

In some embodiments, still referring to FIG. 16, a first fastening lug 4272*b* is arranged on an outer wall surface of the first support frame 4272. One end of the first fastening lug 4272*b* is connected to the first support frame 4272, and the other end of the first fastening lug 4272*b* extends toward a direction away from the first support frame 4272. The first fastening lug 4272*b* may extend in a radial direction of the first support frame 4272. There may be a plurality of first fastening lugs 4272*b*, and the plurality of first fastening lugs 4272*b* are arranged at intervals in the circumferential direction of the first support frame 4272. In this way, when the kernel 42 is assembled on the shell 41, the first fastening lug 4272*b* may be connected to the shell 41, to conveniently fasten the kernel 42 into the shell 41.

Referring to FIG. 11 to FIG. 14 again, the second support frame 4273 is located on a side of the support plate 4271 away from the magnetic circuit system 426. The second support frame 4273 is connected to the support plate 4271. The second diaphragm assembly 424 may be supported on the second support frame 4273. Specifically, a periphery of an edge of the second diaphragm assembly 424 is fastened to the second support frame 4273 through gluing, engagement, threaded connection, or the like, to support the second diaphragm assembly 424. In some embodiments, referring to FIG. 11 to FIG. 13, the second diaphragm assembly 424 may be sandwiched between the support plate 4271 and the second support frame 4273. In some other embodiments, referring to FIG. 14, the second support frame 4273 may be arranged on a side of the second diaphragm assembly 424 close to the support plate 4271.

The support assembly 427 provided in this embodiment of this application can fasten relative positions between components in the magnetic circuit system 426 and relative positions between the components in the magnetic circuit system 426 and the first diaphragm assembly 422 as well as the second diaphragm assembly 424. In addition, the support assembly 427 is of a sandwich structure formed by the support plate 4271, the first support frame 4272, and the second support frame 4273. Therefore, this is conducive to reducing difficulty in machining the support assembly 427 and reducing difficulty in assembling the support assembly 427 in the kernel 42.

Figure 17:
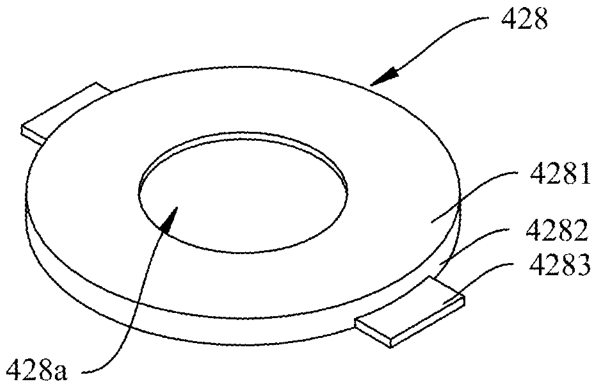
FIG. 17 is a three-dimensional view of a first cover body of a kernel according to some embodiments of this application.

Further, referring to FIG. 15, the kernel 42 further includes a first cover body 428. The first cover body 428 is connected to a surface of a side of the support plate 4271 away from the magnetic circuit system 426. In some embodiments, FIG. 17 is a three-dimensional view of a first cover body 428 according to an embodiment of this application. The first cover body 428 includes a first cover plate 4281 and a first side plate 4282. The first side plate 4282 surrounds a periphery of the first cover plate 4281, the first side plate 4282 is connected to the support plate 4271, and the first cover plate 4281 is spaced apart from the support plate 4271. The first cover body 428 can protect the second diaphragm assembly 424.

A second fastening lug 4283 is arranged on the first side plate 4282. One end of the second fastening lug 4283 is connected to one end of the first side plate 4282 away from the first cover plate 4281, and the other end of the second fastening lug 4283 extends toward a direction away from the first side plate 4282. There may be a plurality of second fastening lugs 4283, and the plurality of first fastening lugs 4272*b* are arranged at intervals in a circumferential direction of the first side plate 4282. In this way, when the kernel 42 is assembled on the shell 41, the second fastening lug 4283 may be connected to the shell 41, to fasten the kernel 42 to the shell 41, thereby improving reliability of connection between the kernel 42 and the shell 41.

Referring to FIG. 15, the second diaphragm assembly 424 is arranged in the first cover body 428, and a second sound cavity 429*b* is defined between the second diaphragm assembly 424 and the first cover body 428. The second diaphragm assembly 424, the support plate 4271, and the second magnetic portion 4262 enclose a cavity 429*c*. A second sound output channel 428*a* in communication with the second sound cavity 429*b* is provided on the first cover body 428. A sound generated through vibration of the second diaphragm assembly 424 may be transmitted to the outside of the kernel 42 through the second sound output channel 428*a*. An opening direction of the second sound output channel 428*a* is the same as the opening direction of the first sound output channel 4272*a*.

For example, referring to FIG. 17, the second sound output channel 428*a* may be formed on the first cover plate 4281, and the second sound output channel 428*a* runs through two opposite surfaces of the first cover plate 4281 in a thickness direction. In this way, a sound output direction of the first diaphragm assembly 422 may be the same as a sound output direction of the second diaphragm assembly 424. During assembly, both the first sound output channel 4272*a* and the second sound output channel 428*a* may be toward the sound output hole 110 of the earphone 100, so that the sounds generated through vibration of the first diaphragm assembly 422 and the second diaphragm assembly 424 are smoothly transmitted to the outside of the earphone 100, thereby improving the sound quality of the earphone 100.

Figure 18:
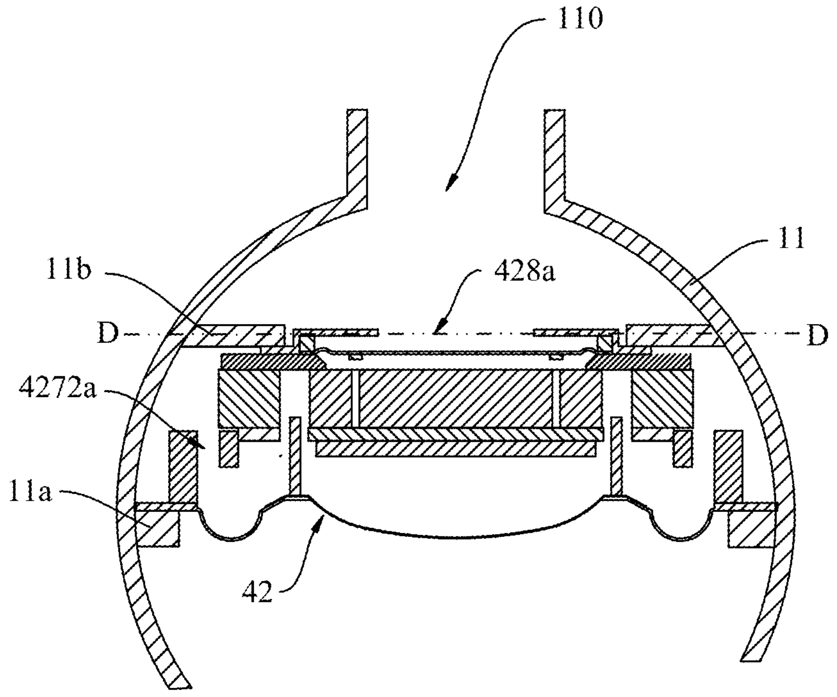
FIG. 18 is a schematic diagram of a kernel assembled in an earphone according to some embodiments of this application.

FIG. 18 is a schematic diagram of a kernel 42 assembled in an earphone 100 according to some embodiments of this application. In this embodiment, the kernel 42 is assembled in the front housing 11 of the earphone 100, and the front housing 11 of the earphone 100 is formed as the shell 41 of the speaker module 4. That is, the kernel 42 is fastened into the front housing 11. A first connecting rib 11*a* and a second connecting rib 11*b* are formed on an inner wall of the front housing 11. The first connecting rib 11*a* is connected to the first fastening lug 4272*b*, and the second connecting rib 11*b* is connected to the second fastening lug 4283. Specifically, the first fastening lug 4272*b* may be arranged on a surface of a side of the first connecting rib 11*a* close to the sound output hole 110 through gluing, engagement, threaded connection, or the like. The second fastening lug 4283 may be arranged on a surface of a side of the second connecting rib 11*b* away from the sound output hole 110 through gluing, engagement, threaded connection, or the like. Therefore, the kernel 42 can be conveniently fastened into the front housing 11.

Figure 19:
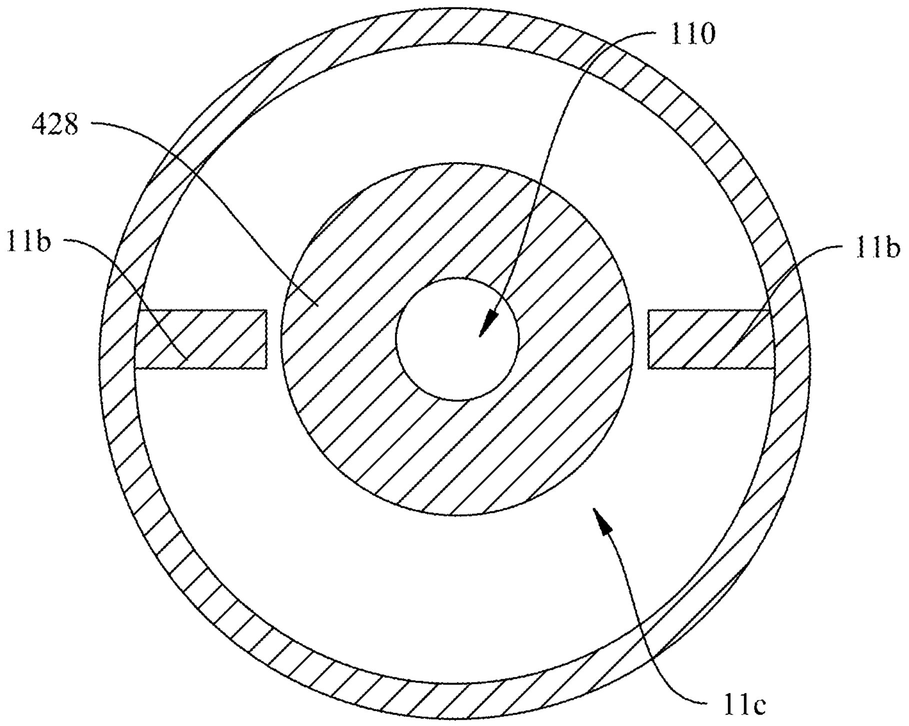
FIG. 19 is a sectional view along a line D-D in FIG. 18.

FIG. 19 is a sectional view along a line D-D in FIG. 18. There are two second connecting ribs 11*b*. The two connecting ribs 11*b* are arranged at an interval in a circumferential direction of the front housing 11, and the two second connecting ribs 11*b* are respectively connected to two fastening lugs 4283. In this way, a hollow region 11*c* may be formed between the two second connecting ribs 11*b*, so that the sound generated through vibration of the first diaphragm assembly 422 may be transmitted from the first sound output channel 4272*a* to the sound output hole 110 through the hollow region.

Figure 20:
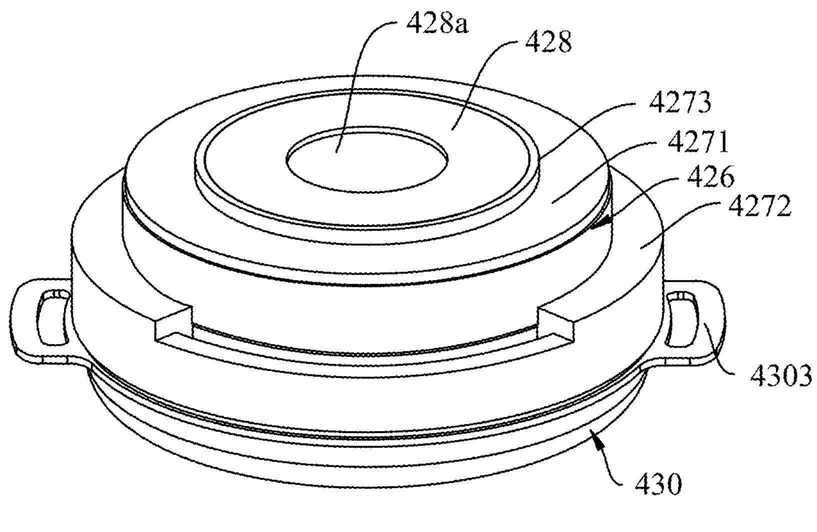
FIG. 20 is a three-dimensional view of a kernel according to still some other embodiments of this application.
Figure 21:
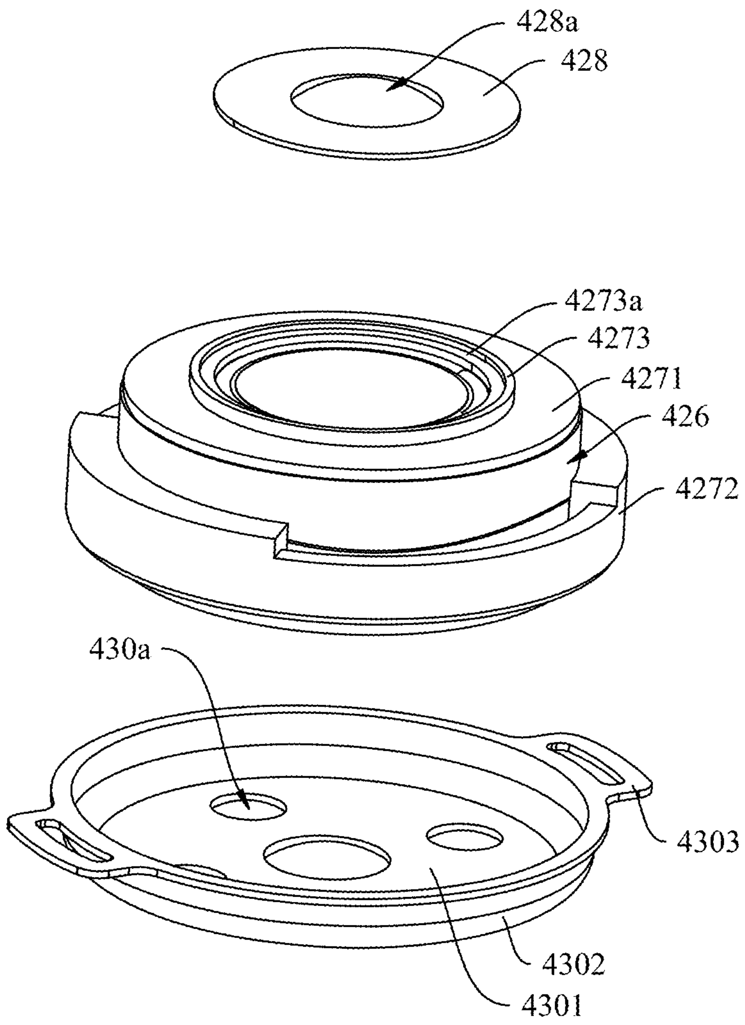
FIG. 21 is an exploded view of the kernel shown in FIG. 20.

In some embodiments, FIG. 20 is a three-dimensional view of a kernel according to some other embodiments of this application, and FIG. 21 is an exploded view of the kernel shown in FIG. 20. In this embodiment, the first cover body 428 is formed as a plate. The first cover body 428 may be arranged on the second support frame 4273. Specifically, an embedding groove 4273*a* may be formed on the second support frame 4273, and the first cover body 428 is embedded into the embedding groove 4273*a*. In this embodiment, when the kernel 42 is assembled in the front housing 11 of the earphone 100, a surface of a side of the first cover body 428 away from the second diaphragm assembly 424 is connected to the second connecting rib 11*b*.

Figure 22:
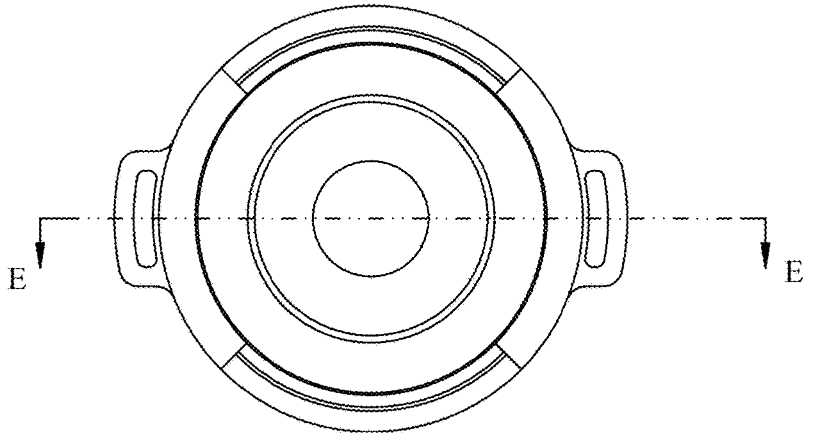
FIG. 22 is a top view of the kernel shown in FIG. 20.
Figure 23:
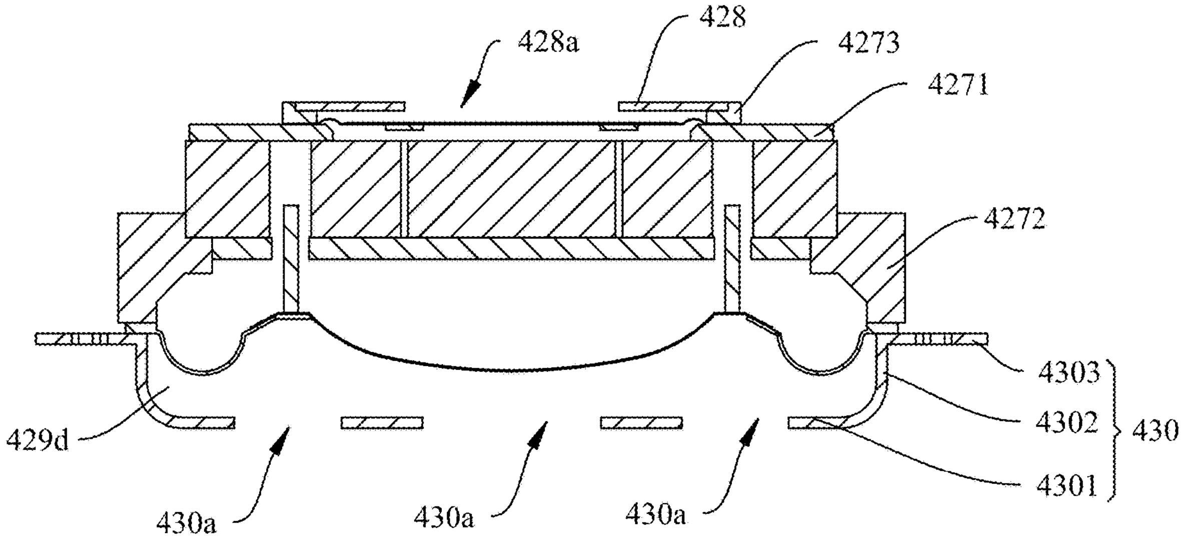
FIG. 23 is a cross-sectional view along a line E-E in FIG. 22.

In some embodiments, referring to FIG. 20 and FIG. 21, the kernel 42 further includes a second cover body 430. The second cover body 430 may include a second cover plate 4301 and a second side plate 4302. The second side plate 4302 surrounds a periphery of the second cover plate 4301. FIG. 22 is a top view of the kernel 42 shown in FIG. 20, and FIG. 23 is a cross-sectional view along a line E-E in FIG. 22. Specifically, the second side plate 4302 is connected to the first diaphragm assembly 422, and the second cover plate 4301 is spaced apart from the first diaphragm assembly 422. The second cover body 430 can protect the first diaphragm assembly 422.

The second cover body 430 and the first diaphragm assembly 422 may enclose a cavity 429*d*. A vent 430*a* configured to communicate an internal space and an external space of the cavity 429*d* may be provided on the second cover body 430. In this way, this allows the atmosphere inside the cavity 429*d* to be balanced with the external atmosphere. For example, referring to FIG. 19 and FIG. 21, the vent 430*a* may be formed on the second cover plate 4301.

Based on the foregoing embodiments, a third fastening lug 4303 is arranged on the second side plate 4302. One end of the third fastening lug 4303 is connected to one end of the second side plate 4302 away from the second cover plate 4301, and the other end of the third fastening lug 4303 extends toward a direction away from the second side plate 4302. There may be a plurality of third fastening lugs 4303, and the plurality of third fastening lugs 4303 are arranged at intervals in a circumferential direction of the second side plate 4302. In this embodiment, when the kernel 42 is assembled on the shell 41, the third fastening lug 4303 may be connected to the first connecting rib 11*a*. It may be understood that when the third fastening lug 4303 is arranged on the second cover body 430, the first fastening lug 4272*b* may not be arranged on the first support frame 4272.

Figure 24:
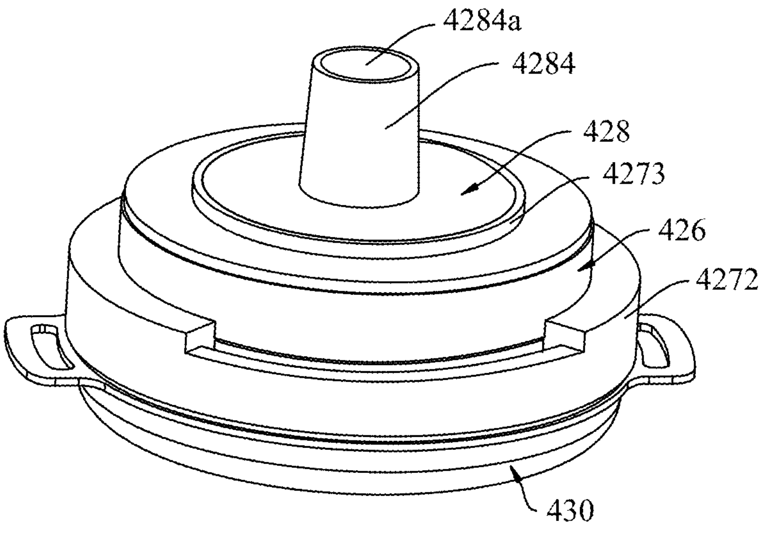
FIG. 24 is a three-dimensional view of a kernel according to still some other embodiments of this application.

In some embodiments, FIG. 24 is a three-dimensional view of a kernel 42 according to still some other embodiments of this application. A difference between the kernel 42 in this embodiment and the kernels 42 shown in FIG. 6 and FIG. 20 lies in that a sound output tube 4284 is further arranged on the first cover body 428 of the kernel 42 in this embodiment. One end of the sound output tube 4284 is in communication with the second sound output channel 428*a*, and the other end of the sound output tube 4284 extends toward a direction away from the second sound cavity 429*b*.

Figure 25:
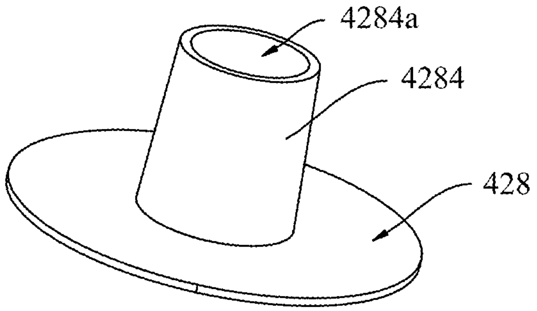
FIG. 25 is a three-dimensional view of a first cover body shown in FIG. 24.
Figure 26:
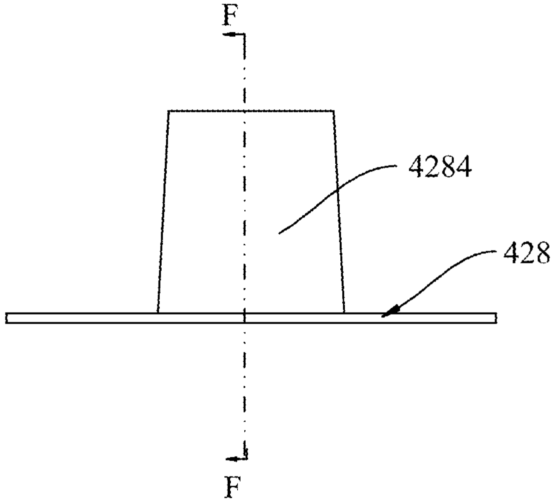
FIG. 26 is a side view of the first cover body shown in FIG. 25.
Figure 27:
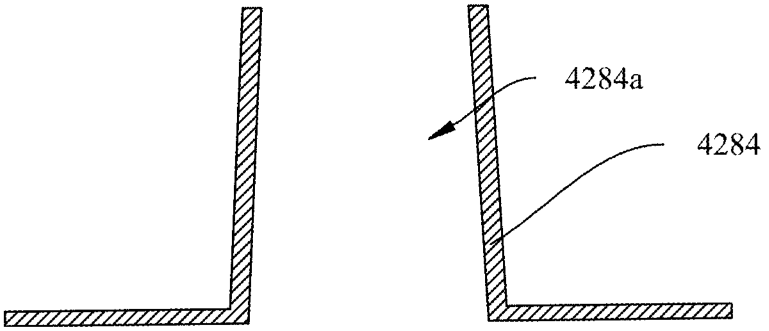
FIG. 27 is a cross-sectional view along a line F-F in FIG. 26.

Referring to FIG. 25 and with reference to FIG. 26 and FIG. 27, the sound output tube 4284 is hollow inside to form a sound output tubeline 4284*a*. In this way, a sound in the second sound cavity 429*b* may be transmitted through the second sound output channel 428*a* to the sound output tubeline 4284*a*, so that when the kernel 42 is assembled in the shell 41 of the speaker module 4, a distance between the second sound output channel 428*a* and the voice output channel 41*a* of the speaker module 4 may be shortened, which is conducive to reducing interference between sounds in the first sound output channel 4272*a* and the second sound output channel 428*a*, and is conducive to improving sound quality of the speaker module 4.

Specifically, in some embodiments, the sound output tube 4284 and the first cover body 428 are integrally formed. In other words, the sound output tube 4284 and the first cover body 428 are of an integral structure. For example, the sound output tube 4284 and the first cover body 428 may be integrally injection-molded. Therefore, connection strength between the sound output tube 4284 and the first cover body 428 may be enhanced, and a structure of the kernel 42 may be simplified, reducing assembly difficulty. In some other embodiments, the sound output tube 4284 and the first cover body 428 are of a separated structure. In this embodiment, the sound output tube 4284 may be arranged on the first cover body 428 through gluing, engagement, threaded connection, or the like.

Figure 28:
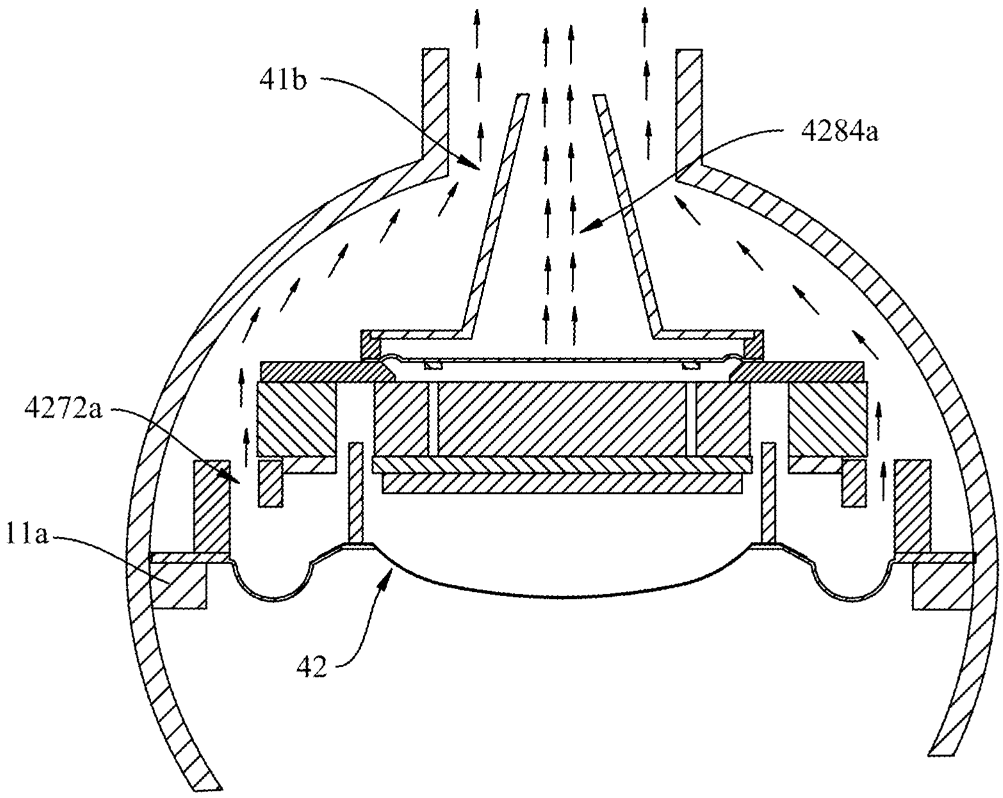
FIG. 28 is a schematic diagram of a kernel assembled in an earphone according to still some other embodiments of this application.

Based on the foregoing embodiments, referring to FIG. 28, when the kernel 42 is assembled in the shell 41 of the speaker module 4, the sound output tube 4284 may extend into the voice output channel 41*a* of the shell 41, and at least a part of an outer wall of the sound output tube 4284 is spaced apart from an inner wall of the voice output channel 41*a*. Specifically, the entire outer wall of the sound output tube 4284 may be spaced apart from the inner wall of the voice output channel 41*a*; or a part of the outer wall of the sound output tube 4284 is spaced apart from the inner wall of the voice output channel 41*a*, and the other part of the outer wall of the sound output tube 4284 is in contact with the inner wall of the voice output channel 41*a*. In this way, a communication channel 41*b* may be defined between the outer wall of the sound output tube 4284 and the inner wall of the voice output channel 41*a*. Referring to FIG. 27, a sound transmitted from the first sound output channel 4272*a* may be transmitted through the communication channel 41*b* spaced apart from the sound output channel to the outside of the shell 41. Because a sound in a first sound cavity 429*a* and a sound in the second sound cavity 429*b* are respectively transmitted through the communication channel 41*b* and a sound output tubeline 4284*a* that are spaced apart to the outside of the shell 41, interference between the sound in the first sound cavity 429*a* and the sound in the second sound cavity 429*b* is effectively avoided, and a sound effect of the speaker module 4 is effectively improved.

It may be understood that when a part of the housing 1 of the earphone 100 is formed as the shell 41 of the speaker module 4, the sound output tube 4284 may extend into the extension portion 112 on the front housing 11.

In some embodiments, referring to FIG. 27, in a direction away from the second sound cavity 429*b*, a tube wall of the sound output tube 4284 extends toward a direction close to a central axis of the sound output tube 4284. This can reduce assembly difficulty of the kernel 42 and the shell 41, and is conducive to improving assembly efficiency.

In some embodiments, referring to FIG. 7 again, a rear leakage hole 4271*b* communicating an internal space of the cavity 429*c* with an external space is provided on the support plate 4271. There may be one or more rear leakage holes 4271*b*. For example, referring to FIG. 7, there may be two rear leakage holes 4271*b*, and each rear leakage hole 4271*b* may extend in a radial direction of the support plate 4271. The rear leakage hole 4271*b* is configured to communicate the atmosphere inside the cavity 429*c* with the external atmosphere. In this way, this allows the atmosphere inside the cavity 429*c* to be balanced with the external atmosphere.

In some other embodiments, the rear leakage hole 4271*b* may alternatively be provided on the second diaphragm assembly 424. It may be understood that in some other embodiments, the cavity 429*c* may alternatively not be in communication with the external space.

Because the speaker module 4 provided in embodiments of this application includes the kernel 42 in any one of the foregoing embodiments, the speaker module 4 and the kernel 42 can resolve the same technical problem, and achieve the same effect.

Because the earphone 100 provided in some embodiments of this application includes the speaker module 4, audio performance of the earphone 100 can be improved while a miniaturized design of the earphone 100 is met.

In the descriptions of this specification, specific features, structures, materials, or characteristics may be combined in a proper manner in any one or more of embodiments or examples.

Finally, it should be noted that, the foregoing embodiments are merely used for describing the technical solutions of this application, but are not intended to limit this application. Although this application is described in detail with reference to the foregoing embodiments, a person of ordinary skill in the art should understand that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of this application.

What is claimed is:

1. A kernel of a speaker module, comprising a first diaphragm assembly, a first voice coil, and a magnetic circuit system, wherein the first voice coil is fastened to the first diaphragm assembly;

the magnetic circuit system comprises a first magnetic portion and a second magnetic portion, the first magnetic portion surrounds a periphery of the second magnetic portion, the first magnetic portion is spaced apart from the second magnetic portion, and the first voice coil cooperates with the first magnetic portion and the second magnetic portion to drive the first diaphragm assembly to vibrate;

an inner side of the second magnetic portion comprises an accommodating space, the magnetic circuit system further comprises a third magnetic portion, and the third magnetic portion is arranged in the accommodating space, and is spaced apart from the second magnetic portion;

the kernel further comprises a second diaphragm assembly and a second voice coil, the second diaphragm assembly and the first diaphragm assembly are respectively arranged on two opposite sides of the magnetic circuit system, the second voice coil is fastened to the second diaphragm assembly, the second voice coil is a planar voice coil, and the second voice coil cooperates with the second magnetic portion and the third magnetic portion to drive the second diaphragm assembly to vibrate;

the first magnetic portion is a first magnet, the second magnetic portion is a second magnet, the third magnetic portion is a third magnet, a magnetization direction of the first magnet is opposite to a magnetization direction of the second magnet, and a magnetization direction of the third magnet is opposite to the magnetization direction of the second magnet;

the magnetic circuit system further comprises a first magnetically conductive yoke and a second magnetically conductive yoke, the first magnetically conductive yoke is arranged on a surface of a side of the first magnet close to the first diaphragm assembly, and the second magnetically conductive yoke is arranged on surfaces of sides of the second magnet and the third magnet close to the first diaphragm assembly;

a support assembly, wherein the support assembly comprises a support plate, a first support frame, and a second support frame;

the support plate is made of a magnetically conductive material, the magnetic circuit system further comprises a third magnetically conductive yoke, the third magnetically conductive yoke is arranged on a surface of a side of the third magnetic portion close to the second diaphragm assembly, a second magnetic gap is defined between the support plate and the third magnetically conductive yoke, and the second voice coil is arranged in the second magnetic gap; and a protrusion portion protruding toward the magnetic circuit system is arranged on the second diaphragm assembly, and the second voice coil is arranged on the protrusion portion.

2. The kernel according to claim 1, wherein a first magnetic gap is defined between the first magnetic portion and the second magnetic portion, and at least a part of the first voice coil extends into the first magnetic gap.

3. The kernel according to claim 1, wherein the first diaphragm assembly is a low-frequency diaphragm assembly, and the second diaphragm assembly is a high-frequency diaphragm assembly.

4. The kernel according to claim 1, wherein the magnetic circuit system further comprises a secondary magnet, the secondary magnet is arranged on a surface of a side of the second magnetically conductive yoke away from the second magnet and the third magnet, and a magnetization direction of the secondary magnet is opposite to the magnetization direction of the second magnet.

5. The kernel according to claim 1, wherein the magnetic circuit system further comprises a fourth magnet, the fourth magnet is arranged between the third magnet and the second magnet, the second magnet and the third magnet are both spaced apart from the fourth magnet, a magnetization direction of the fourth magnet is perpendicular to the magnetization direction of the third magnet, a magnetic polarity of an end of the fourth magnet close to the third magnet is the same as a magnetic polarity of an end of the third magnet close to the first diaphragm assembly, and a magnetic polarity of an end of the fourth magnet away from the third magnet is the same as a magnetic polarity of an end of the third magnet away from the first diaphragm assembly.

6. The kernel according to claim 1, wherein the support plate is located on a surface of a side of the first magnetic portion away from the first diaphragm assembly, the first magnetic portion and the second magnetic portion are both connected to the support plate, an avoidance hole is provided on an inner side of the support plate, and an orthographic projection of the third magnetic portion on the support plate is located in the avoidance hole;

the first support frame is located between the first diaphragm assembly and the support plate, the first diaphragm assembly is supported on the first support frame, and the first support frame is connected to the magnetic circuit system; and the second support frame is located on a side of the support plate away from the magnetic circuit system, the second diaphragm assembly is supported on the second support frame, and the first support frame, the support plate, and the second support frame are relatively fastened.

7. The kernel according to claim 1, wherein a first sound cavity is defined among the first diaphragm assembly, the first support frame, and the magnetic circuit system, and a first sound output channel in communication with the first sound cavity is provided on the first support frame.

8. The kernel according to claim 7, wherein the kernel further comprises a first cover body, the first cover body is connected to a surface of a side of the support plate away from the magnetic circuit system, the second diaphragm assembly is arranged in the first cover body, a second sound cavity is defined between the second diaphragm assembly and the first cover body, and a second sound output channel in communication with the second sound cavity is provided on the first cover body.

9. The kernel according to claim 8, wherein a sound output direction of the first sound output channel is the same as a sound output direction of the second sound output channel.

10. The kernel according to claim 1, wherein the kernel further comprises a second cover body, the second cover body is connected to a surface of a side of the first diaphragm assembly away from the magnetic circuit system, and a fourth sound cavity is defined between the second cover body and the first diaphragm assembly.

11. The kernel according to claim 10, wherein a vent configured to communicate an internal space and an external space of the cavity is provided on the second cover body.

12. The kernel according to claim 8, wherein a sound output tube is arranged on the first cover body, one end of the sound output tube is in communication with the second sound output channel, and the other end of the sound output tube extends towards a direction away from the second sound cavity.

13. The kernel according to claim 11, wherein the second cover body includes a second cover plate and a second side plate, the second side plate surrounds a periphery of the second cover plate, and the second side plate is connected to the first diaphragm assembly, and the second cover plate is spaced apart from the first diaphragm assembly.

14. A speaker module, comprising:

a shell; and a kernel, wherein the kernel is the kernel according to claim 1, and the kernel is arranged in the shell.

15. An earphone, comprising:

a housing, wherein a sound output hole is formed on the housing; and a speaker module, wherein the speaker module is the speaker module according to claim 14, the speaker module is arranged in the housing, and a voice output channel of the speaker module is in communication with the sound output hole.

16. The earphone according to claim 15, wherein the housing comprises:

a front housing, wherein the sound output hole is formed on the front housing; and a rear housing, wherein the rear housing is connected to the front housing, the rear housing and the front housing enclose a containing space, and the speaker module is arranged in the containing space.

17. The earphone according to claim 16, wherein a main board of the earphone is arranged in the containing space, the speaker module is electrically connected to the main board, and the speaker module is located on a side of the main board close to the sound output hole.

18. The earphone according to claim 15, wherein a first magnetic gap is defined between the first magnetic portion and the second magnetic portion, and at least a part of the first voice coil extends into the first magnetic gap.

19. The earphone according to claim 15, wherein the first diaphragm assembly is a low-frequency diaphragm assembly, and the second diaphragm assembly is a high-frequency diaphragm assembly.

20. The earphone according to claim 15, wherein the magnetic circuit system further comprises a secondary magnet, the secondary magnet is arranged on a surface of a side of the second magnetically conductive yoke away from the second magnet and the third magnet, and a magnetization direction of the secondary magnet is opposite to the magnetization direction of the second magnet.

* * * * *